US012457320B1

(12) United States Patent
Chen

(10) Patent No.: US 12,457,320 B1
(45) Date of Patent: Oct. 28, 2025

(54) SYSTEMS AND METHODS FOR ENHANCED PLAYBACK OF STEREOSCOPIC MEDIA

(71) Applicant: Adeia Guides Inc., San Jose, CA (US)

(72) Inventor: Tao Chen, Palo Alto, CA (US)

(73) Assignee: Adeia Guides Inc., San Jose, CA (US)

( * ) Notice: Subject to any disclaimer, the term of this patent is extended or adjusted under 35 U.S.C. 154(b) by 0 days.

(21) Appl. No.: 18/787,754

(22) Filed: Jul. 29, 2024

(51) Int. Cl.
| | |
|---|---|
| H04N 13/00 | (2018.01) |
| H04N 13/10 | (2018.01) |
| H04N 13/398 | (2018.01) |
| H04N 13/20 | (2018.01) |
| H04N 21/80 | (2011.01) |

(52) U.S. Cl.
CPC .................................. *H04N 13/398* (2018.05)

(58) Field of Classification Search
CPC ........ H04N 13/00; H04N 13/10; H04N 21/80; H04N 21/816; H04N 21/8146; H04N 13/20
USPC .................................. 348/42, 51, 52, 48, 61
See application file for complete search history.

(56) References Cited

U.S. PATENT DOCUMENTS

| | | | |
|---|---|---|---|
| 4,967,267 | A | 10/1990 | Gallaher |
| 5,126,878 | A | 6/1992 | Trumbull et al. |
| 5,943,165 | A | 8/1999 | Huang |
| 2004/0233275 | A1 | 11/2004 | Tomita |
| 2013/0010061 | A1 | 1/2013 | Matsubara |
| 2018/0045934 | A1* | 2/2018 | Sugie ................. A61B 1/00193 |
| 2018/0081429 | A1* | 3/2018 | Akenine-Moller ..... G06F 3/013 |
| 2020/0051207 | A1* | 2/2020 | Ogasawara ............ G06F 3/012 |

FOREIGN PATENT DOCUMENTS

| | | |
|---|---|---|
| EP | 0134871 A1 | 3/1985 |
| EP | 0271871 A2 | 6/1988 |
| WO | 2007/019793 A1 | 2/2007 |

OTHER PUBLICATIONS

Banitalebi-Dehkordi, A., et al., "Effect of eye dominance on the perception of stereoscopic 3D video", 2014 IEEE International Conference on Image Processing (ICIP), 2014, 5 pages.
Johansson, J., et al., "Eye dominance in binocular viewing conditions", Journal of Vision, vol. 15, No. 21, Jul. 2015, 17 pages.
(Continued)

*Primary Examiner* — Daquan Zhao
(74) *Attorney, Agent, or Firm* — HALEY GUILIANO LLP

(57) ABSTRACT

Systems and methods are provided for enhancing playback of stereoscopic media. The dominant eye of a viewer is identified, and the lower-quality media channel segment of received stereoscopic media is also identified. In response to the lower-quality media channel being mapped to the dominant eye of the viewer, the left-eye media in the left-eye media channel is mirrored to generate a mirrored right-eye media, and the right-eye media in the right-eye media channel is mirrored to generate a mirrored left-eye media. In the stereoscopic media, the left-eye media is replaced with the mirrored left-eye media, and the right-eye media is replaced with the mirrored right-eye media to generate a modified stereoscopic media. The modified stereoscopic media is then displayed to a viewer to provide a higher quality viewing experience.

20 Claims, 11 Drawing Sheets

(56) References Cited

OTHER PUBLICATIONS

Lee, K., et al., "3D Perception Based Quality Pooling: Stereopsis, Binocular Rivalry, and Binocular Suppression", IEEE Journal of Selected Topics in Signal Processing, vol. 9, No. 3, Apr. 2015, pp. 533-545.

Liu, S., et al., "Asymmetric stereoscopic video encoding algorithm based on subjective visual characteristic", 2009 International Conference on Wireless Communications & Signal Processing, Nov. 2009.

U.S. Appl. No. 18/375,335, filed Sep. 29, 2023, "Systems and Methods for Towing Electric Vehicles", First Name Inventor: Toshiro Ozawa.

Wang, J., et al., "Quality prediction of asymmetrically compressed stereoscopic videos", 2015 IEEE International Conference on Image Processing (ICIP), Sep. 2015, 5 pages.

* cited by examiner

SYSTEMS AND METHODS FOR ENHANCED PLAYBACK OF STEREOSCOPIC MEDIA

BACKGROUND

This disclosure is related to providing content, and more particularly to systems and methods for providing stereoscopic media.

SUMMARY

Stereoscopic media, which may present either an image or a video, has been used for years to present three-dimensional (3D) images and video to viewers. In general, with respect to video, stereoscopic media includes a left-eye media channel and a right-eye media channel, and each media channel includes video that is slightly different (e.g., a different viewing angle of the same scene) from the video in the other media channel. When the videos in the two media channels are viewed simultaneously as a stereoscopic video, the viewer perceives the stereoscopic video as a 3D video due to, e.g., parallax differences between the videos in each channel. Similarly, stereoscopic media based on images may be used to present 3D images to a viewer.

A problem that frequently arises with stereoscopic media is when media in one of the two channels is a different (e.g., lower) quality than media in the other channel. A quality discrepancy in the left and right channels may be due to, e.g., bandwidth constraints, compression, encryption requirements, and/or other media capturing and/or processing techniques. This difference in quality generally makes no difference to viewers who view the higher-quality media channel with their dominant eye. However, if those users view the lower-quality media channel with their dominant eye, the composite stereoscopic media is perceived to have a lower quality. With about 60-70% of the population being right-eye dominant, this can result in a substantial left-eye dominant audience perceiving any single stereoscopic media content at a lower-than-desired quality.

This quality difference between media channels of stereoscopic media typically arises from the way stereoscopic media is created, distributed, and/or transmitted. Some professionally produced stereoscopic media may have no quality differences between the videos of two channels while being produced in the studio. However, stereoscopic media is generally compressed for distribution and/or transmission to the end viewer, and common compression schemes for stereoscopic media utilize asymmetric compression techniques. Such compression techniques may improve coding efficiency by compromising the image quality of one media channel, and such compression techniques assume that the overall perceptual quality can be maintained in a viewer who can see equally well out of both eyes. Some professionally produced stereoscopic media may be created knowing that asymmetric compression techniques will be used, such that efficiencies are introduced into the creative process by starting with one higher-quality media channel and one lower-quality media channel. For such stereoscopic media, the asymmetric compression process does not significantly compromise the image quality of the media channel that is already of lower quality. Still, a substantial amount of professionally produced stereoscopic media reaches the viewer with one media channel being higher quality than the other media channel.

Non-professionals may also create stereoscopic media using smartphones that are equipped with multiple cameras, each camera having different lenses spaced apart on the body of the smartphone, e.g., allowing for depth. However, each camera on a smartphone typically has a different purpose (e.g., primary camera, telephoto camera, ultra-wide camera, and the like), and each camera frequently therefore also produces images with different pixel capabilities (e.g., 12 megapixels, 48 megapixels, etc.). When images/video from multiple cameras on a smartphone are used to create stereoscopic media, the media channel using the images/video from the lower megapixel camera will automatically be a lower quality. Moreover, since a smartphone may be used in any orientation to create images/video (e.g., vertical, upside down, horizontally left, horizontally right, or innumerable angles in between), one stereoscopic media created by the same smartphone user may have a different, higher-quality media channel than the next stereoscopic media created by the same smartphone user. If the phone is oriented where the lower quality camera is capturing for the right eye, a majority of the population may view the media at a resolution that is less than optimal. For instance, a smartphone capturing a video horizontally (e.g., in a widescreen format) may have the primary camera as the highest and farthest left in one orientation and may have the primary camera lowest and farthest right when rotated 180 degrees. Whether video is produced by professionals or non-professionals, stereoscopic media often includes unequal image quality between the two channels. Thus, for multiple reasons, the way stereoscopic media is created, distributed, and/or transmitted can have a particularly high impact on the quality of the stereoscopic media perceived by the viewer.

A need therefore exists to optimize the quality of stereoscopic media with disparate channel quality. To address this need and overcome the shortcomings introduced by existing systems that create, distribute, and/or transmit stereoscopic media, systems and methods that identify the dominant eye of a viewer and, when needed, modify the stereoscopic media to present the higher-quality media channel to the viewer's dominant eye are presented. The enhanced playback may be achieved by determining if stereoscopic media includes a higher-quality media channel and mapping that higher-quality media channel to the dominant eye of the user viewing the stereoscopic media. This mapping may be performed by the user equipment presenting the stereoscopic media to the user for viewing.

The modifications to stereoscopic media have low processing complexity, such that most viewer's equipment would be able to perform the modifications in real time to present the viewer with the highest quality stereoscopic media possible based on the initial quality of the stereoscopic media and the viewer's own sight capabilities, e.g., without disturbing the stereoscopic production and distribution processes. For instance, some embodiments may identify the viewer's dominant eye, determine if the lower-quality media channel is mapped for display to the viewer's dominant eye, and if so, perform mirror and swap functions between media in the left-eye media channel and media in the right-eye media channel. The modified stereoscopic media will therefore map the higher-quality media channel for display to the viewer's dominant eye. As discussed herein, stereoscopic media with spatial audio and/or subtitles may also be modified using low processing requirements to improve the overall quality of stereoscopic media perceived by the viewer.

BRIEF DESCRIPTION OF THE DRAWINGS

The present disclosure, in accordance with one or more various embodiments, is described in detail with reference to the following figures. The drawings are provided for purposes of illustration only and merely depict typical or example embodiments. These drawings are provided to facilitate an understanding of the concepts disclosed herein and should not be considered limiting of the breadth, scope, or applicability of these concepts. It should be noted that for clarity and ease of illustration, these drawings are not necessarily made to scale. The figures include.

DETAILED DESCRIPTION

Figure 1:
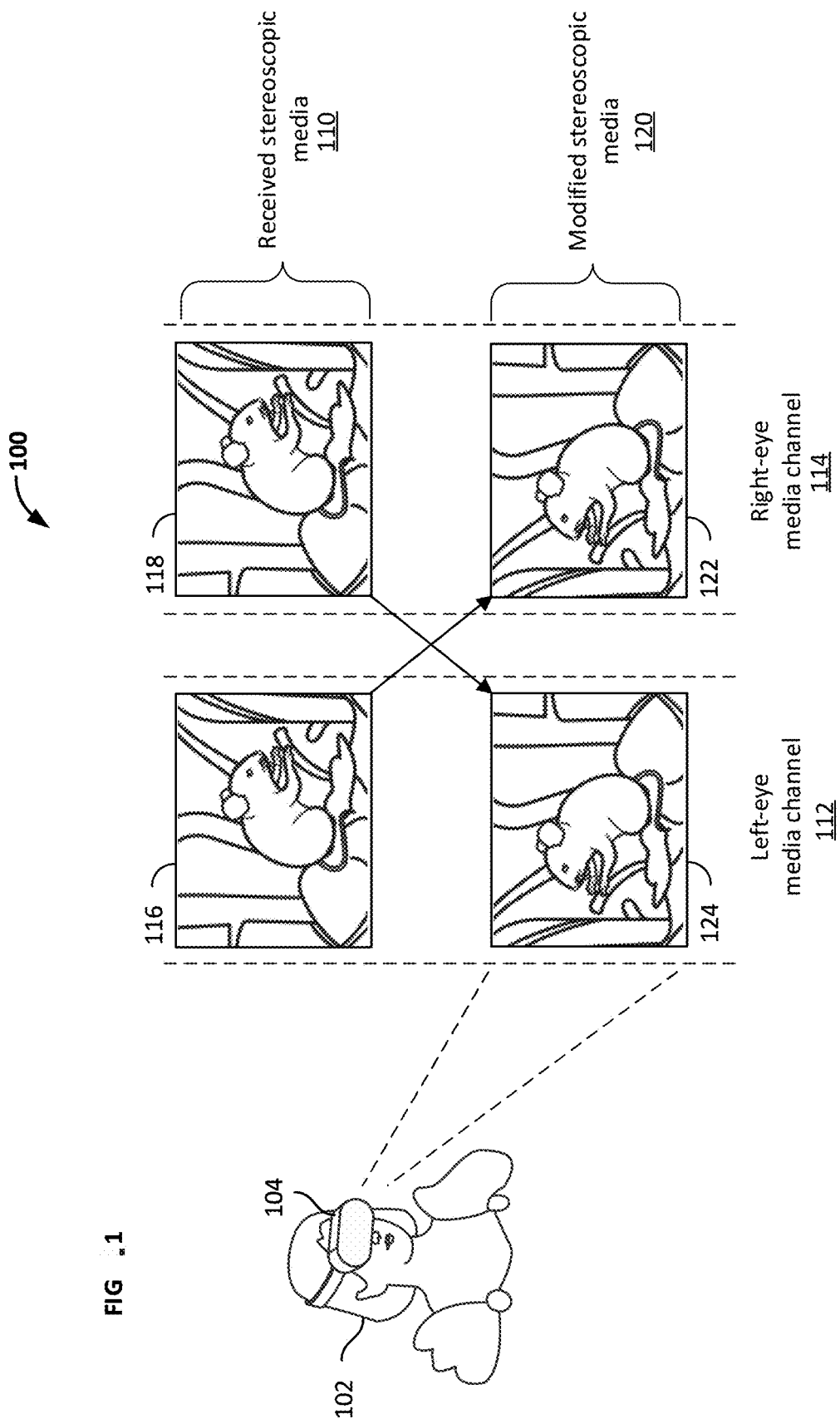
FIG. 1 shows an exemplary environment in which enhanced playback of stereoscopic media is employed to improve the perceived quality of the viewer, in accordance with embodiments of the disclosure.

Systems and methods are described herein for enhancing playback of stereoscopic media. The systems and methods may be used to improve the presentation of stereoscopic media to a viewer, particularly with high-quality displays, by providing an improved perceived picture quality from stereoscopic media. Advantageously, the systems and methods are based on display-side processing that can be achieved without upgrades to most display-side user equipment and without changes to the compression techniques used for distribution and/or communication of the stereoscopic media to user equipment. In addition, the systems and methods described herein may be leveraged to reduce the complexities of video encoding optimization for stereoscopic media.

As referred to herein, the term "content" should be understood to mean an electronically consumable asset accessed using any suitable electronic platform, such as broadcast television, pay-per-view, on-demand (as in video-on-demand (VOD) systems), network-accessible media (e.g., streaming media, downloadable media, Webcasts, etc.), video clips, information about media, images, animations, documents, playlists, websites and webpages, articles, books, electronic books, blogs, chat sessions, social media, software applications, games, virtual reality media, augmented reality media, and/or any other media or multimedia and/or any combination thereof. Extended reality (XR) content, which is a type of content, refers to augmented reality (AR) content, virtual reality (VR) content, hybrid or mixed reality (MR) content, and/or other digital content combined therewith to mirror physical-world objects, including interactions with such content.

The term "stereoscopic media," as used herein, should be understood to be any type of content (including XR content) that includes images and/or video of the same scene separated into a left-eye media channel and a right-eye media channel. The images and/or video in the left-eye media channel may have a different viewing angle of the scene as compared to the images and/or video in the right-eye media channel, such that when the media in each of the left-eye media channel and the right-eye media channel are viewed simultaneously, the viewer may perceive the stereoscopic media as 3D media.

In general, stereoscopic media includes a left-eye media channel and a right-eye media channel, with each media channel including media content. For purposes of discussion herein, the media content in the left-eye media channel may be referred to as the left-eye media, or other similar term, and the media content in the right-eye media channel may be referred to as the right-eye media, or other similar term. The left-eye media and the right-eye media may include images/video of a scene from two different viewing perspectives to create parallax between the left-eye media and the right-eye media. To enable a viewer to view the stereoscopic media and perceive the viewed media as 3D media, the left-eye media in the left-eye media channel is mapped for viewing to the left eye of the viewer, and the right-eye media in the right-eye media channel is mapped for viewing to the right eye of the viewer. The left and right eye mappings, combined with parallax between the left-eye media and the right-eye media, enable the viewer to perceive the stereoscopic media as 3D media.

Turning in detail to the drawings, FIG. 1 shows a first example of an environment 100 in which enhanced playback of stereoscopic media is employed to improve the perceived quality of the viewer 102. In this environment 100, the viewer 102 is wearing a head-mounted display (HMD) 104 that is configured to display stereoscopic media to the viewer 102. In some embodiments, the stereoscopic media may be displayed to the viewer 102 as stand-alone content. In some embodiments, the stereoscopic media may be displayed to the viewer 102 as part of other content, such as part of extended reality (XR) content, television content, electronic book content, website content, social media content, chat content, etc.

In some embodiments, the HMD 104 may be XR glasses and/or goggles for displaying XR media to the viewer. In such embodiments, the XR media may be created entirely using stereoscopic media so that the viewer 102 within the XR environment views the XR media stereoscopically. Alternatively, in such embodiments, the XR media may include a sub-part that includes the stereoscopic media so that the viewer 102 may view the stereoscopic media in a section of and/or on demand within the XR environment.

In some embodiments, stereoscopic glasses may be used in combination with a display screen (e.g., a smartphone, a tablet computer, a laptop computer, a television, a computer display, and the like) in place of the HMD 104. In such embodiments, the display screen may be configured to display the left- and right-eye media channels of the stereoscopic media with different light polarizations, and the stereoscopic glasses may be configured to transmit one of the media channels to each eye using polarization filters. Other types of image/video displays may be used in combination with stereoscopic glasses so that a viewer perceives the stereoscopic media as 3D media. Likewise, other types of stereoscopic glasses may be used in combination with other types of displays so that a viewer perceives the stereoscopic media as 3D media.

Figure 2:
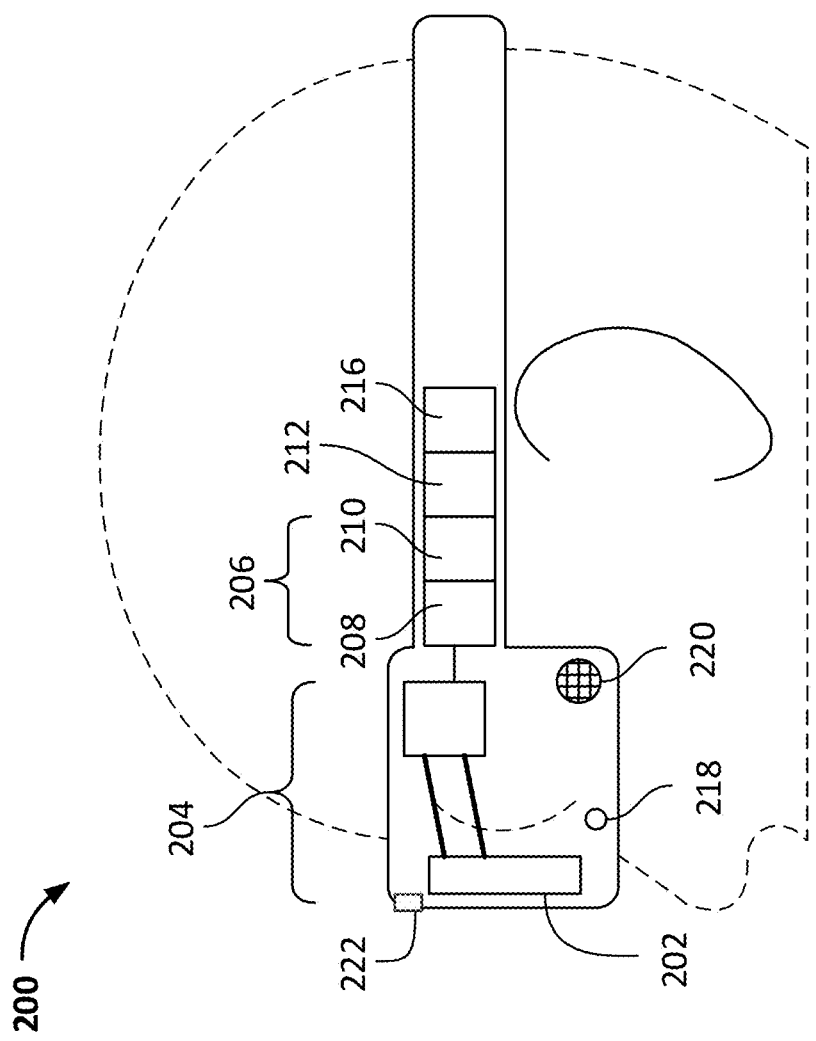
FIG. 2 shows an illustrative head-mounted display for enhancing playback of stereoscopic media, in accordance with some embodiments of this disclosure.

The HMD 104 in this environment 100 receives stereoscopic media 110 from a media source (see FIG. 2). The stereoscopic media 110 includes a left-eye media channel 112 and a right-eye media channel 114. The left-eye media channel 112 includes left-eye media 116, and the right-eye media channel 114 includes right-eye media 118. The left-eye media channel 112 is mapped to display the left-eye media 116 to the left eye of the viewer 102, and the right-eye media channel 114 is mapped to display the right-eye media 118 to the right eye of the viewer 102.

Before displaying the received stereoscopic media 110 to the viewer 102, the HMD 104 identifies whether the left eye or the right eye is the dominant eye of the viewer 102. In some embodiments, this identification may be done prior to receiving the stereoscopic media 110 by conducting a brief visual test for the viewer 102 to determine which eye is dominant. When done in advance, the identification of the dominant eye may be stored and associated with a user profile for the viewer 102, and the identification of the dominant eye may thereafter be determined simply by accessing the data stored in the user profile. In some embodiments, the HMD 104 may perform a brief visual test to determine the dominant eye of the viewer 102.

Also before displaying the received stereoscopic media 110 to the viewer 102, the HMD 104 identifies if one of the left-eye media channel 112 and the right-eye media channel 114 is a lower-quality media channel than the other. This identification may be performed by determining if one of the left-eye media 116 and the right-eye media 118 is lower-quality media than the other. If the left-eye media 116 is determined to be the lower-quality media, then the left-eye media channel 112 is identified as the lower-quality media channel. If the right-eye media 118 is determined to be the lower-quality media, then the right-eye media channel 114 is identified as the lower-quality media channel.

In some embodiments, metadata associated with the stereoscopic media may be used to identify which of the left-eye media 116 and the right-eye media 118 is the lower-quality media. In some embodiments, the compression type, if an asymmetric compression algorithm was employed, may be used to identify which of the left-eye media 116 and the right-eye media 118 is the lower-quality media. Asymmetric compression algorithms, by their nature, process the left-eye media 116 and the right-eye media 118 of the stereoscopic media 110 differently, which results in the quality of one of the left-eye media 116 and the right-eye media 118 being compromised. The decompression process may be used to determine which of the left-eye media 116 and the right-eye media 118 was subject to quality compromises during the compression process, thus enabling identification of the lower-quality media as between the left-eye media 116 and the right-eye media 118. In some embodiments, a comparison of the left-eye media 116 and the right-eye media 118 may be performed to determine which is the lower-quality media. For example, the HMD 104 may compare the left-eye media 116 and the right-eye media 118 based on one or more factors such as the bitrates, the effective resolutions, the overall focus, the range of brightness values for pixels, and the presence and quantity of compression artifacts, among others.

With both the dominant eye and the lower-quality media channel identified, the HMD 104 may generate a modified stereoscopic media 120 in response to the lower-quality media channel being mapped to the dominant eye. In general, the modified stereoscopic media is a version of the received stereoscopic media with the higher-quality media displayed in the media channel that is mapped to the dominant eye of the viewer. With the higher-quality media displayed to the dominant eye of the viewer, the viewer perceives the stereoscopic media as having a higher quality. Advantageously, such a low-complexity display-side solution to improve the perceived display quality of stereoscopic media not only improves the 3D experience for the viewer of the stereoscopic media, but it also has the potential to introduce additional efficiencies on the back end of creation, production, and distribution of stereoscopic media.

The modified stereoscopic media 120 is generated by mirror and swap functions performed on the left-eye media 116 and the right-eye media 118. These mirror and swap functions may be performed in any order, however, for purposes of this description, the mirror function is performed first. The mirror function horizontally mirrors the left-eye media 116 to generate a mirrored right-eye media 122, and the mirror function also horizontally mirrors the right-eye media 118 to generate a mirrored left-eye media 124. In the swap function, the left-eye media 116 in the left-eye media channel 112 is replaced with the mirrored left-eye media 124, and the right-eye media 118 in the right-eye media channel 114 is replaced with the mirrored right-eye media 122. These mirror and swap functions generate the modified stereoscopic media 120, which may then be displayed to the viewer 102 using the HMD 104.

Performing a swap function without also performing a mirror function results in a visual mess for the resulting stereoscopic media, such that a swap function without a mirror function is not able to enhance playback of stereoscopic media. Similarly, performing a mirror function without also performing a swap function results in stereoscopic media that presents the viewer with skewed perspectives. The combination of the mirror and swap functions, however, can, for many types of stereoscopic media, accurately reproduce the viewing experience of stereoscopic media while providing higher quality playback for viewers.

FIG. 2 shows an illustrative head-mounted display (HMD) 200 for enabling a user to view stereoscopic media. The HMD 200 includes components in accordance with some embodiments of this disclosure, such that the HMD 200 shown is intended to be non-limiting. The HMD 200 includes a display 202 enclosed within a mask 204, control circuitry 206, storage 210, input/output (I/O) circuitry 212, and a power source 216. The control circuitry 206 may include a processor 208. The HMD 200 may also include one or more integrated components such as a microphone 218, a speaker 220, and/or a camera 222. The HMD 200 may also include an input interface for communicably coupling external devices (e.g., game controllers, XR controllers, keyboards, remotes, touch-sensitive input devices, speakers, etc.) to the HMD 200.

The HMD 200 may access, transmit, receive, and/or retrieve content and data, including stereoscopic media, via the I/O circuitry 212 communicably coupled to the control circuitry 206. As an illustrative example, the I/O circuitry 212 may provide the control circuitry 206 with access to content (e.g., broadcast programming, on-demand programming, internet content, content available over a local area network (LAN) or wide area network (WAN), and/or other content) and data. The control circuitry 206 may be used to send and receive commands, requests, and other data using the I/O circuitry 212. The I/O circuitry 212 may communicatively couple the control circuitry 206 to other user equipment, networks, servers, and the like.

The display 202 is depicted as a generalized embodiment of a head-mounted display for viewing an XR environment. The display 202 may include an optical system of one or more optical elements such as a lens in front of an eye of the viewer, one or more waveguides, or an electro-sensitive plane. The display 202 includes an image source providing light output as an image to the optical element. Some non-limiting examples of a display include a tensor display, a light field display, a volumetric display, a multi-layer display, an LCD display, amorphous silicon display, low-temperature polysilicon display, electronic ink display, electrophoretic display, active matrix display, electro-wetting display, electro-fluidic display, cathode ray tube display, light-emitting diode display, organic light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying XR content.

The control circuitry 206 may be based on any suitable control circuitry. As referred to herein, control circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. A processor 208 may include video processing circuitry (e.g., integrated and/or a discrete graphics processor). In some embodiments, the control circuitry 206 may be distributed across multiple separate processors or processing units, for example, multiple of the same type of processing units (e.g., two Intel Core i7 processors) or multiple different processors (e.g., an Intel Core i5 processor and an Intel Core i7 processor). In some embodiments, the control circuitry 206 executes instructions stored in memory (e.g., the storage 210). Specifically, the control circuitry 206 may be instructed to perform any of the functions described herein.

The control circuitry 206 may include or be communicatively coupled to video generating circuitry and tuning circuitry, such as one or more analog tuners, one or more H.265 decoders or any other suitable digital decoding circuitry, high-definition tuners, or any other suitable tuning or video circuits or combinations of such circuits. Conversion circuitry (e.g., for converting over-the-air, analog, or digital signals to MPEG signals for storage) may also be provided. The control circuitry 206 may also include scaler circuitry for upconverting and downconverting content into a suitable output format for the HMD 200. The control circuitry 206 may also include or be communicatively coupled to digital-to-analog converter circuitry and analog-to-digital converter circuitry for converting between digital and analog signals. The tuning and generating circuitry may be used by the HMD 200 to receive and to display, to play, and/or to record content. The tuning and generating circuitry may also be used to receive video generating data. The circuitry described herein, including, for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If the storage 210 is provided or supplemented by a separate device from the HMD 200, the tuning and generating circuitry (including multiple tuners) may be associated with the storage 210.

The storage 210 may be any device for storing electronic data, such as random-access memory, solid state devices, quantum storage devices, hard disk drives, non-volatile memory or any other suitable fixed or removable storage devices, and/or any combination of the same. The storage 210 may be an electronic storage device that is part of the control circuitry 206. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. The storage 210 may store data defining images for display by the HMD 200. The storage 210 may be used to store various types of content described herein including XR asset data. Nonvolatile memory may also be used (e.g., to launch a boot-up routine and other instructions). Cloud-based storage may be used to supplement the storage 210 or instead of the storage 210.

The control circuitry 206 may include or be coupled to the I/O circuitry 212, which is suitable for communicating with servers, edge computing systems and devices, table or database servers, or other networks or servers. The instructions for carrying out the above-mentioned functionality may be stored on a server. Such communications may involve the internet or any other suitable communication networks. In addition, the I/O circuitry 212 may include circuitry that enables peer-to-peer communication of user equipment devices, or communication of user equipment devices in locations remote from each other. In some embodiments, the I/O circuitry 212 may include circuitry that communicatively couples the HMD 200 to one or more other devices over a network. For example, the I/O circuitry 212 may include a network adaptor and associated circuitry. The I/O circuitry 212 may include wires and/or busses for connecting to a physical network port (e.g., an ethernet port, a wireless WiFi port, cellular communication port, or any other type of suitable physical port). Although communication paths are not shown, the HMD 200 may communicate directly or indirectly with other devices and/or user equipment via one or more communication paths and/or communication networks including short-range, point-to-point communication paths, such as USB cables, IEEE 1394 cables, wireless paths (e.g., Bluetooth, infrared, IEEE 802-11x, etc.), or other short-range communication via wired or wireless paths. For example, the I/O circuitry 212 may include a Bluetooth network adaptor.

The power source 216 may include a source of power or an interface for coupling to an external power source. The power source 216 may be coupled to other components of the HMD 200. Some non-limiting examples of a power source 216 include a battery, solar generator, and/or a wired power source.

The microphone 218 and the speaker 220 may be included as integrated equipment with other elements of the HMD 200. In some embodiments, the microphone 218 and the speaker 220 may be external to the HMD 200 as stand-alone units. An audio component of videos and other content, including stereoscopic media, may be played through the speaker 220 (or external headphones or other external audio device). The microphone 218 may receive audio input such as voice commands or speech. For example, a user may speak voice commands that are received by the microphone 218 and recognized by control circuitry 206.

The camera 222 may be any suitable type of image sensor, camera, or other form of optical sensor operating in the visual spectrum that is configured to capture successive images as a video. In some embodiments, the image sensor is integrated with the HMD 200. In some embodiments, the image sensor may be external and communicably connected to the AR head-mounted display. In some embodiments, the image sensor may be a digital camera that includes a charge-coupled device (CCD) and/or a complementary metal-oxide semiconductor (CMOS) image sensor. In some embodiments, the image sensor may be an analog camera that converts still analog images to digital images via the control circuitry 206 or via a video card.

In some embodiments, the HMD 200 may be communicatively coupled to one or more user input interfaces or devices. Some examples of input devices include a remote control, a secondary user device, a touch-sensitive display, a smartphone device, a tablet, a remote control, mouse, trackball, keypad, keyboard, touchscreen, touchpad, stylus input, joystick, voice recognition interface, and/or other user input interfaces. In some embodiments, the HMD 200 may include an integrated eye-tracking system or other image sensors directed at the user's eyes to enable determining the dominant eye of the user. In some embodiments, the HMD 200 may include one or more user interfaces (e.g., buttons, touch-sensitive bars, etc.) for a user to manually provide input to the HMD 200.

Figure 3:
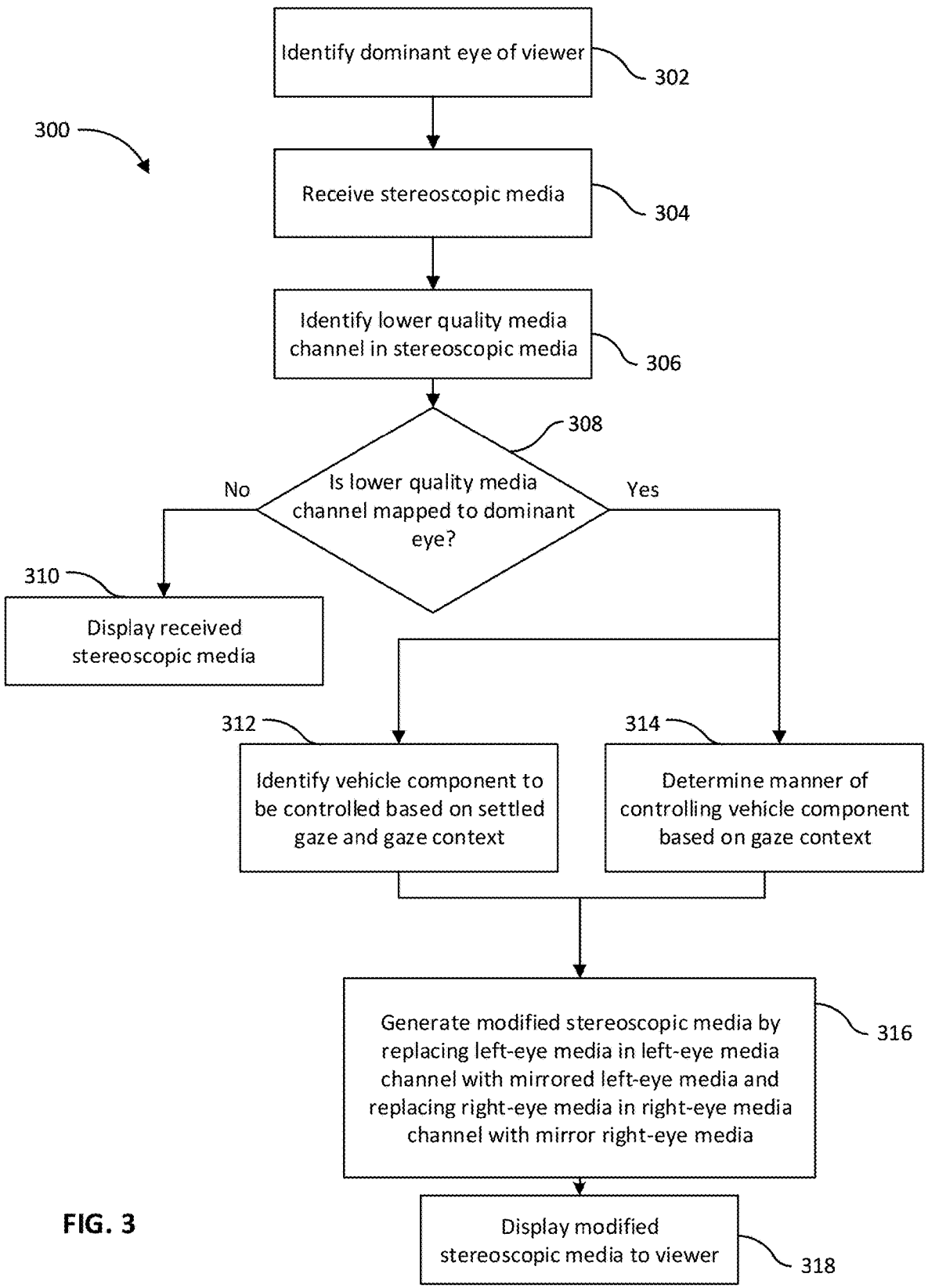
FIG. 3 is a flowchart showing a first exemplary process for enhancing playback of stereoscopic media, in accordance with embodiments of the disclosure.

FIG. 3 is a flowchart illustrating the steps of an exemplary process 300 for enhanced playback of stereoscopic media to a viewer. The process 300 may be implemented on the user equipment discussed herein and other systems for enhancing playback of stereoscopic media. One or more actions of the process may be incorporated into or combined with one or more actions of any other process or embodiment described herein. For purposes of clarity, this process 300 is described in the context of being implemented on the HMD 200 shown in FIG. 2. At step 302, the control circuitry identifies the dominant eye of the user wearing the HMD. In some embodiments, the dominant eye of the user may be identified by reference to profile data associated with the user of the HMD. In some embodiments, the HMD may instruct the user through a brief visual test to determine which eye is the user's dominant eye. At step 304, the HMD receives the stereoscopic media from a media content source. In some embodiments, the media content source may be other user equipment or a server on a local network. In some embodiments, the media content source may be a server, other remote system, or remote device that communicates the stereoscopic media over a wide area network.

Once the HMD has received the stereoscopic media, at step 306 the control circuitry identifies which of the left-eye media channel and the right-eye media channel in the stereoscopic media is the lower-quality media channel. This identification is performed by determining which of the left-eye media and the right-eye media is the lower-quality media. If the left-eye media is determined to be the lower-quality media, then the left-eye media channel is identified as the lower-quality media channel. If the right-eye media is determined to be the lower-quality media, then the right-eye media channel is identified as the lower-quality media channel.

In some embodiments, metadata associated with the stereoscopic media may be used to identify which of the left-eye media and the right-eye media is the lower-quality media. In some embodiments, if an asymmetric compression algorithm was employed, the compression algorithm, or alternatively the decompression process or metadata associated with the compressed media, may be used to identify which of the left-eye media and the right-eye media is the lower-quality media. In some embodiments, a comparison of the left-eye media and the right-eye media may be performed to determine which is the lower-quality media. For example, the HMD may compare the left-eye media and the right-eye media based on one or more factors such as the bitrates, the effective resolutions the overall focus, the range of brightness values for pixels, and the presence and quantity of compression artifacts, among others.

At step 308, the control circuitry determines if the identified lower-quality media channel is mapped to the dominant eye. If the identified lower-quality media channel is not mapped to the dominant eye, then at step 310, the received stereoscopic media is displayed to the user of the HMD. If the identified lower-quality media channel is mapped to the dominant eye, then at step 312, the control circuitry mirrors the left-eye media to generate mirrored right-eye media, and at step 314 the control circuitry mirrors the right-eye media to generate mirrored left-eye media. After the mirrored media is generated, at step 316 the control circuitry generates modified stereoscopic media by (1) replacing the left eye media in the left-eye media channel of the stereoscopic media with the mirrored left-eye media and (2) replacing the right eye media in the right-eye media channel of the stereoscopic media with the mirrored right-eye media. In combination, steps 312, 314, and 316 mirror and swap the left-eye media and right-eye media. These mirror and swap functions for the left-eye media and the right-media are performed to preserve the disparity and depth in the stereoscopic media as displayed to the viewer. At step 318 the HMD displays the modified stereoscopic media to the viewer, who in this process 300 is the user of the HMD.

Figure 4:
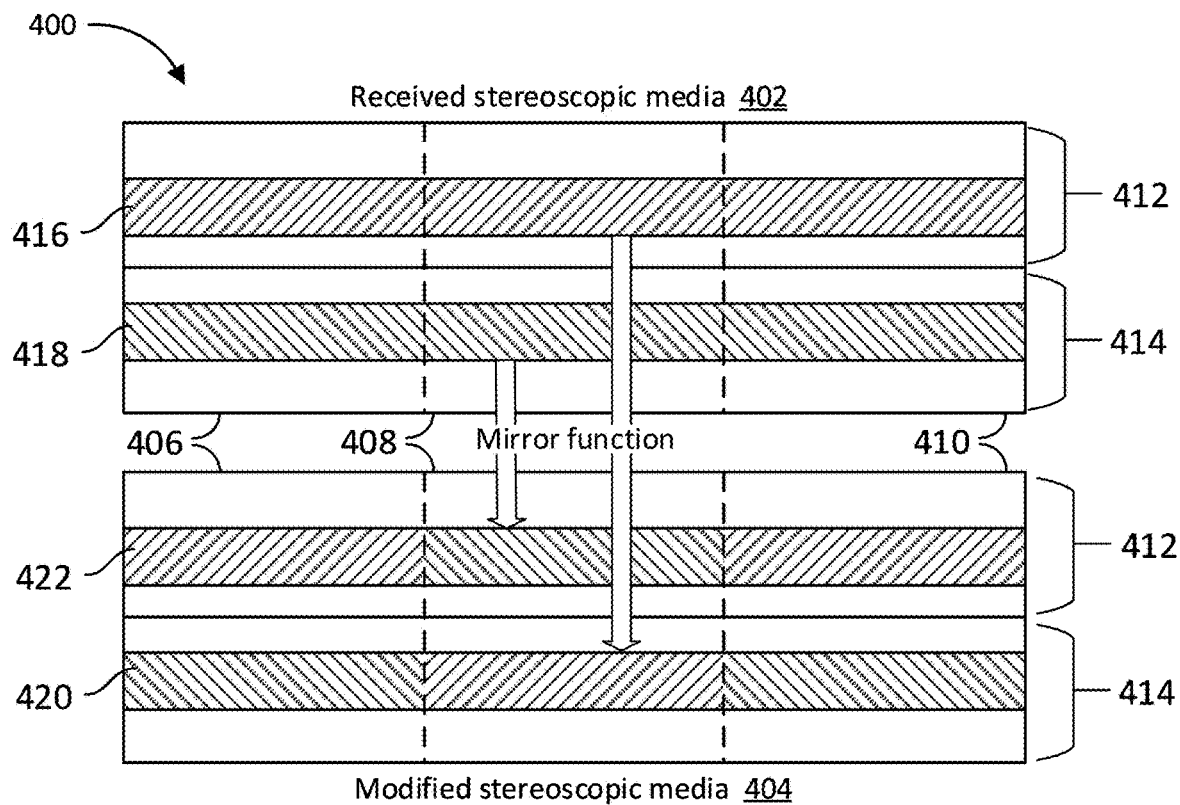
FIG. 4 schematically illustrates mirror and swap functions for one media segment of stereoscopic media, in accordance with embodiments of the disclosure.

FIG. 4 schematically illustrates a first exemplary process 400 for generating modified stereoscopic media 404 from received stereoscopic media 402. For purposes of clarity, the process 400 previously determined that the viewer's left eye is dominant, and the received stereoscopic media 402 does not include a spatial audio track, subtitles, or other text displayed within the media. The received stereoscopic media 402 in this process 400 includes three media segments 406, 408, 410 with a left-eye media channel 412 and a right-eye media channel 414 extending across all three media segments 406, 408, 410. Additional or fewer media segments may be included as part of the stereoscopic media 402. In this process 400, each media segment 406, 408, 410 may each represent a different video scene in stereoscopic media 402. Differentiation between the media segments 406, 408, 410 may be achieved through a variety of techniques. In some embodiments, media segments may be differentiated from each other (i.e., where one media segment ends, and another media segment begins) based on metadata associated with the received stereoscopic media 402 identifying time codes for the beginning and end of different scenes. In some embodiments, media segments may be differentiated from each other based on identifying cuts, fades, or other transitions between scenes. In some embodiments, media segments may be differentiated based on the presence of advertisement insertion indicators embedded within or associated with media content. Other techniques may be used to differentiate between the media segments 406, 408, 410, and the manner of differentiating between media segments is intended to be non-limiting The left-eye media channel 412 includes left-eye media 416 extending across the three media segments 406, 408, 410, and similarly, the right-eye media channel 414 includes right-eye media 418 extending across the three media segments 406, 408, 410. In this process 400, the left-eye media 416 and the right-eye media 418 within each of the three media segments 406, 408, 410 may be analyzed to determine whether a difference in quality exists between the left-eye media 416 and the right-eye media 418 within each media segment 406, 408, 410. For example, the first media segment 406 may be analyzed to determine that the right-eye media 418 is lower quality than the left-eye media 416 within the first media segment 406. Therefore, within the first media segment 406, the process 400 identifies the right-eye media channel 414 as the lower-quality media channel. The second media segment 408 may be analyzed to determine that the left-eye media 416 is lower quality than the right-eye media 418 within the second media segment 408. Therefore, within the second media segment 408, the process 400 identifies the left-eye media channel 412 as the lower-quality media channel. The third media segment 410 may be analyzed to determine that no difference in quality exists between the left-eye media 416 and the right-eye media 418 within the third media segment 410. Therefore, within the third media segment 410, the process 400 does not identify either of the left-eye media channel 412 or the right-eye media channel 414 as a lower-quality media channel.

Based on the process determining that the left eye is the dominant eye of the viewer and that of the three media segments 406, 408, 410, only the second media segment 408 includes a lower-quality media channel mapped to the dominant eye of the viewer, the process 400 proceeds to generate the modified stereoscopic media 404. In this process 400, mirror and swap functions are performed only on the second media segment 408 because the second media segment 408 is the only one of the three media segments 406, 408, 410 that includes a lower-quality media channel mapped to the dominant eye of the viewer. Additionally, performing a mirror and swap on the first media segment 406 would result in delivering lower quality stereoscopic media to the viewer. Thus, the process 400 does not perform any actions on the first media segment 406 or the third media segment 410. Within the second media segment 408, the process 400 mirrors the left-eye media 416 to generate mirrored right-eye media 420 and mirrors the right-eye media 418 to generate mirrored left-eye media 422. Then, within the second media segment 508 in the modified stereoscopic media 404, the process 400 replaces the left-eye media 416 in the left-eye media channel 412 with the mirrored left-eye media 422 and replaces the right-eye media 418 in the right-eye media channel 414 with the mirrored right-eye media 420. When the modified stereoscopic media 404 is displayed to a viewer (using suitable display and/or viewing equipment), the second media segment 408 will be perceived by the viewer will perceive to have a higher quality than it would if it were displayed to the viewer in the stereoscopic media 402.

As can be seen from this process 400, only those media segments 406, 408, 410 of the stereoscopic media 402 that include a lower-quality media channel mapped to the dominant eye of the viewer are transformed by the mirror and swap functions when generating the modified stereoscopic media 404. In some embodiments, one or more other media segments may be transformed along with the second media segment 408, although it may not be desirable to perform such additional transformations if they result in reducing the perceived quality of the other media segments or otherwise creating other undesirable issues with the resulting modified stereoscopic media 404.

Figure 5:
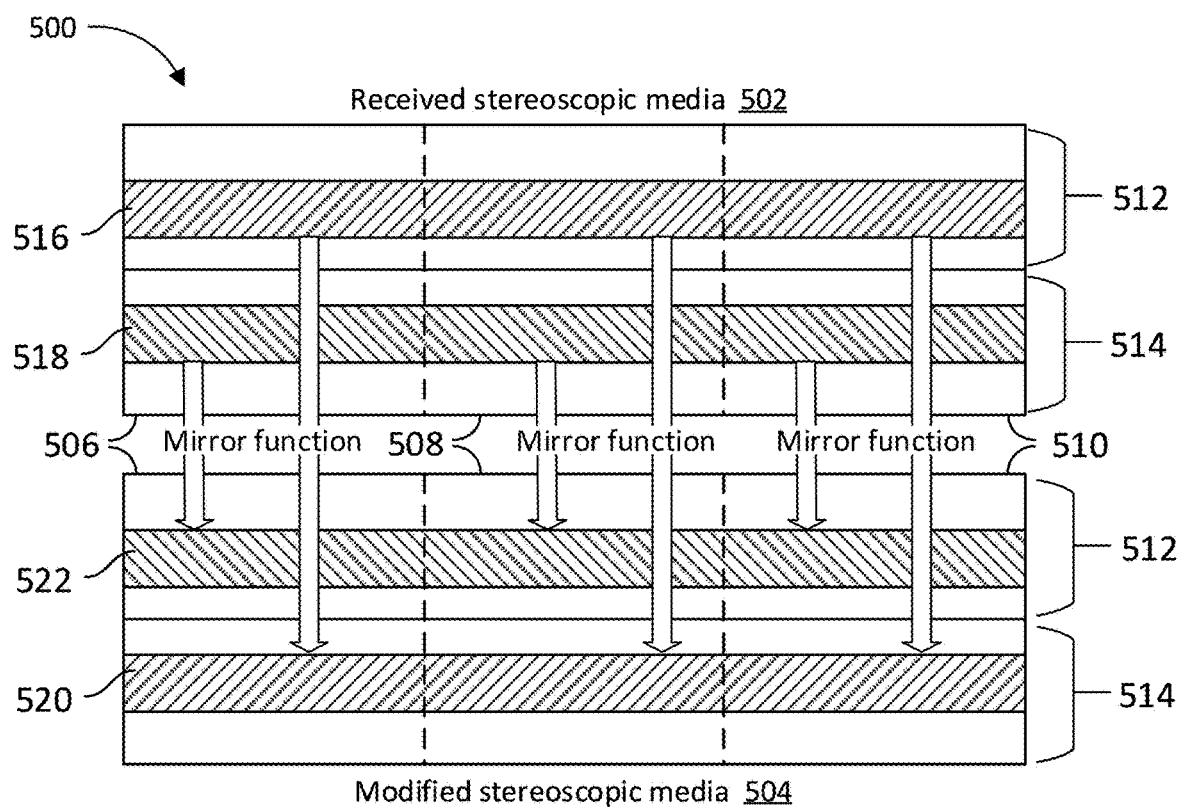
FIG. 5 schematically illustrates mirror and swap functions for multiple media segments of stereoscopic media, in accordance with embodiments of the disclosure.

FIG. 5 schematically illustrates a second exemplary process 500 for generating modified stereoscopic media 504 from received stereoscopic media 502. For purposes of clarity, the process 500 previously determined that the viewer's left eye is dominant, and the received stereoscopic media 502 does not include a spatial audio track, subtitles, or other text displayed within the media. The received stereoscopic media 502 in this process 500 includes three media segments 506, 508, 510 with a left-eye media channel 512 and a right-eye media channel 514 extending across all three media segments 506, 508, 510. Additional or fewer media segments may be included as part of the stereoscopic media 502. In this process 500, each media segment 506, 508, 510 may represent a different video scene in stereoscopic media 502. Differentiation between the media segments 506, 508, 510 may be achieved through a variety of techniques, as described above.

The left-eye media channel 512 includes left-eye media 516 extending across the three media segments 506, 508, 510, and similarly, the right-eye media channel 514 includes right-eye media 518 extending across the three media segments 506, 508, 510. In this process 500, the left-eye media 516 and the right-eye media 518 within each of the three media segments 506, 508, 510 may be analyzed to determine whether a difference in quality exists between the left-eye media 516 and the right-eye media 518 within each media segment 506, 508, 510. For example, the first media segment 506 may be analyzed to determine that the left-eye media 516 is lower quality than the right-eye media 518 within the first media segment 506. Therefore, within the first media segment 506, the process 500 identifies the left-eye media channel 512 as the lower-quality media channel. The second media segment 508 may be analyzed to determine that no difference in quality exists between the left-eye media 516 and the right-eye media 518 within the second media segment 508. Therefore, within the second media segment 508, the process 500 does not identify either of the left-eye media channel 512 or the right-eye media channel 514 as a lower-quality media channel. The third media segment 510 may be analyzed to determine that no difference in quality exists between the left-eye media 516 and the right-eye media 518 within the third media segment 510. Therefore, within the third media segment 510, the process 500 does not identify either of the left-eye media channel 512 or the right-eye media channel 514 as a lower-quality media channel.

Based on the process determining that the left eye is the dominant eye of the viewer and that, of the three media segments 506, 508, 510, only the first media segment 506 includes a lower-quality media channel mapped to the dominant eye of the viewer, the process 500 proceeds to generate the modified stereoscopic media 504. In this process 500, mirror and swap functions are performed to generate the modified stereoscopic media 504. In some embodiments, as in this process 500, the mirror and swap functions may be performed on all the media segments 506, 508, 510, as doing so would not reduce the quality of any of the media segments 506, 508, 510 in the modified stereoscopic media 504. In some embodiments, the mirror and swap functions may be performed only on the first media segment 506. Within each of the media segments 506, 508, 510, the process 500 mirrors the left-eye media 516 to generate mirrored right-eye media 520 and mirrors the right-eye media 518 to generate mirrored left-eye media 522. Then, within each of the media segments 506, 508, 510 in the modified stereoscopic media 504, the process 500 replaces the left-eye media 516 in the left-eye media channel 512 with the mirrored left-eye media 522 and replaces the right-eye media 518 in the right-eye media channel 514 with the mirrored right-eye media 520. When the modified stereoscopic media 504 is displayed to a viewer (using suitable display and/or viewing equipment), the first media segment 506 will be perceived by the viewer to have a higher quality than it would if it were displayed to the viewer in the stereoscopic media 502, and the viewer would perceive no difference in quality for either of the second and third media segments 508, 510 if compared to the stereoscopic media 502.

As can be seen from this process 500, all media segments 506, 508, 510 of the stereoscopic media 502 may be transformed by the mirror and swap functions, as part of generating the modified stereoscopic media 504, when any one of the media segments 506, 508, 510 includes a lower-quality media channel mapped to the dominant eye of the viewer. However, if the mirror and swap functions would reduce the perceived quality of any media segment, the process may skip performing the mirror and swap functions on such media segments.

Figure 6:
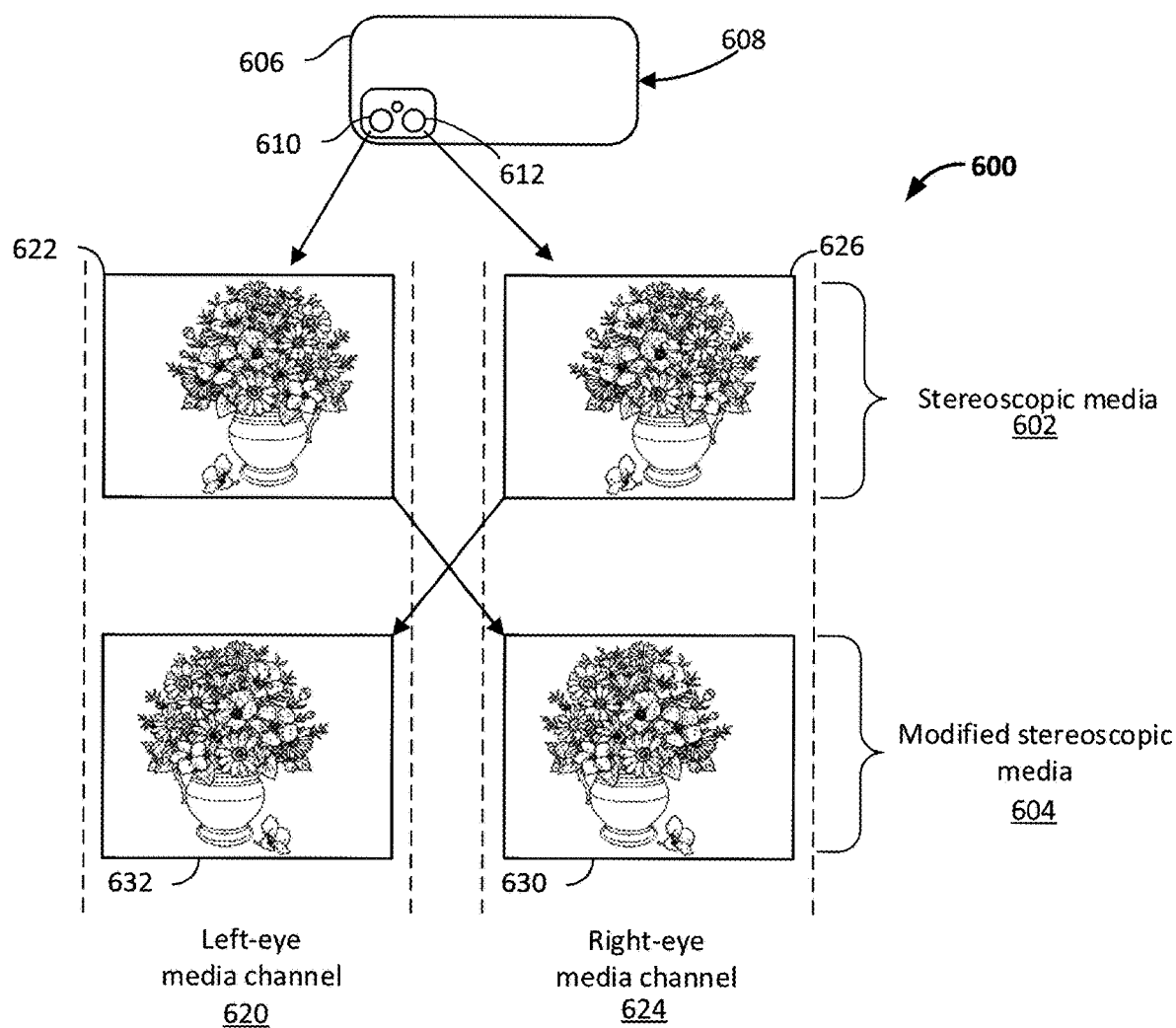
FIG. 6 graphically illustrates the creation of stereoscopic media using a smartphone in a first landscape orientation and subsequent mirror and swap functions for the created stereoscopic media, in accordance with embodiments of the disclosure.

FIG. 6 schematically illustrates a first exemplary process 600 for generating modified stereoscopic media 602 from stereoscopic media 604 created by a smartphone 606 (the back side of the smartphone 606 is shown). For consistency and clarity, the description of this process 600 is provided in the context of video captured by the smartphone 606. The smartphone 606 is shown in a landscape orientation 608 that may be used to create the stereoscopic media 602 using two cameras 610, 612 (each camera is represented by the respective lens on the backside of the smartphone) incorporated into the smartphone 606. The first camera 610 is the primary camera for the smartphone 606, and the second camera 612 is an ultra-wide-angle camera for the smartphone 606. In this smartphone 606, like most typical smartphones, the first camera 610 utilizes an image sensor that captures video with two to four times, or more, the number of pixels as compared to the image sensor utilized by the second camera 612. As a result, when the cameras 610, 612 are used to create stereoscopic media by simultaneously capturing video of a scene, video captured by the second (ultra-wide angle) camera 612 needs to be cropped to match the framing of video captured by the first camera 610. This cropping process typically eliminates more than half the pixels in captured video by the second camera 612. Thus, when the stereoscopic media 604 is generated using the smartphone 606, the media channel containing media captured by the second camera 612 will generally be the lower-quality media channel.

With the smartphone 606 in the landscape orientation 608, the first camera 610 is on the left and the second camera 612 is on the right. For purposes of clarity in the description of this process 600, the video captured by the first camera 610 becomes the left-eye media 622 in the left-eye media channel 620, and the video captured by the second camera 612 becomes the right-eye media 626 in the right-eye media channel 624. In combination, the left-eye media channel 620 and the right-eye media channel 624 form the stereoscopic media 602. As a result, because video from the second camera 612 is the lower-quality media due to cropping needed to match the framing of video from the first camera 610, the right-eye media channel 624 is the lower-quality media channel.

To enhance playback of the stereoscopic media 602 when the right eye of the viewer is dominant, the process 600 transforms the stereoscopic media 602 to generate the modified stereoscopic media 604 by performing mirror and swap functions. In this process 600, the stereoscopic media 604 includes no segments, so the mirror and swap functions are performed on the entirety of the stereoscopic media 602. The process 600 mirrors the left-eye media 622 to generate mirrored right-eye media 630 and mirrors the right-eye media 626 to generate mirrored left-eye media 632. Then, the process 600 replaces the left-eye media 622 in the left-eye media channel 620 with the mirrored left-eye media 632 and replaces the right-eye media 626 in the right-eye media channel 624 with the mirrored right-eye media 630. When the modified stereoscopic media 604 is displayed to a viewer (using suitable display and/or viewing equipment), the viewer would perceive the modified stereoscopic media 604 to have a higher quality if compared to the stereoscopic media 602.

Figure 7:
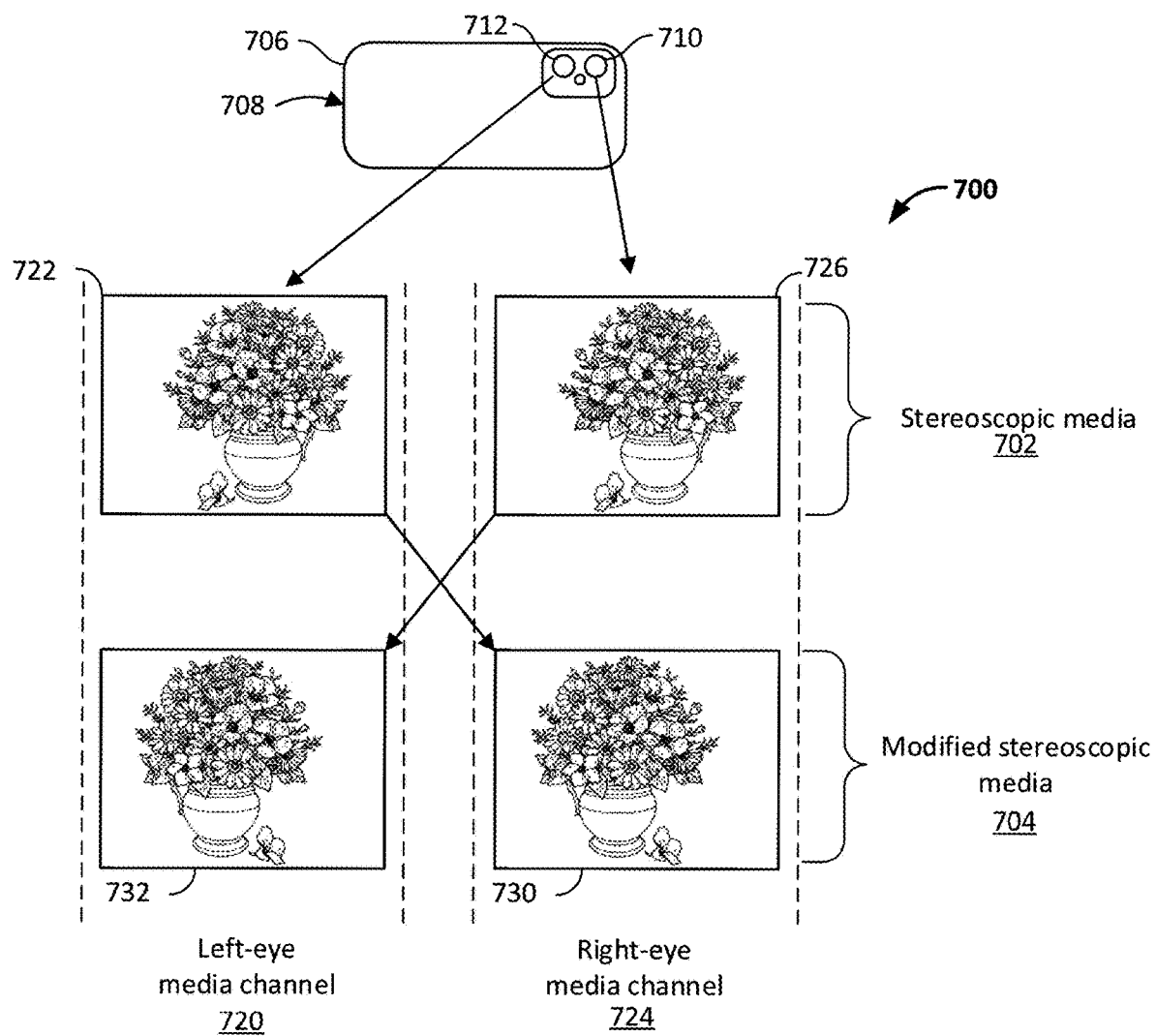
FIG. 7 graphically illustrates the creation of stereoscopic media using a smartphone in a second landscape orientation and subsequent mirror and swap functions for the created stereoscopic media, in accordance with embodiments of the disclosure.

FIG. 7 schematically illustrates a second exemplary process 700 for generating modified stereoscopic media 704 from stereoscopic media 702 created by a smartphone 706 (the backside of the smartphone 706 is shown). For consistency and clarity, the description of this process 700 is provided in the context of video captured by the smartphone 706. The smartphone 706 is shown in a landscape orientation 708 that may be used to create the stereoscopic media 702 using two cameras 710, 712 (each camera is represented by the respective lens on the backside of the smartphone) incorporated into the smartphone 706. The first camera 710 is the primary camera for the smartphone 706, and the second camera 712 is an ultra-wide-angle camera for the smartphone 706. The smartphone 706 may be identical, or nearly identical, to the smartphone 606 of FIG. 6, with the only difference being the smartphone 706 in the landscape orientation 708 is rotated 180° as compared to the smartphone 606 in the landscape orientation 608. As discussed above with respect to the smartphone 606, when the stereoscopic media 702 is generated using the smartphone 706, the media channel containing media captured by the second camera 712 is the lower-quality media channel.

The smartphone 706 is shown with the first camera 710 on the right and the second camera 712 on the left. For purposes of clarity in the description of this process 700, the video captured by the second camera 712 becomes the left-eye media 722 in the left-eye media channel 720, and the video captured by the first camera 710 becomes the right-eye media 726 in the right-eye media channel 724. In combination, the left-eye media channel 720 and the right-eye media channel 724 form the stereoscopic media 702. As a result, because video from the second camera 712 is the lower-quality media due to cropping needed to match the framing of video from the first camera 710, the left-eye media channel 720 is the lower-quality media channel.

To enhance playback of the stereoscopic media 702 when the left eye of the viewer is dominant, the process 700 transforms the stereoscopic media 702 to generate the modified stereoscopic media 704 by performing mirror and swap functions. In this process 700, the stereoscopic media 702 includes no segmenting, so the mirror and swap functions are performed on the entirety of the stereoscopic media 702. The process 700 mirrors the right-eye media 726 to generate mirrored left-eye media 732 and mirrors the left-eye media 722 to generate mirrored right-eye media 730. Then, the process 700 replaces the right-eye media 726 in the right-eye media channel 724 with the mirrored right-eye media 732 and replaces the left-eye media 726 in the left-eye media channel 724 with the mirrored left-eye media 730. When the modified stereoscopic media 704 is displayed to a viewer (using suitable display and/or viewing equipment), the viewer perceives the modified stereoscopic media 704 to have a higher quality if compared to the stereoscopic media 702.

Figure 8A:
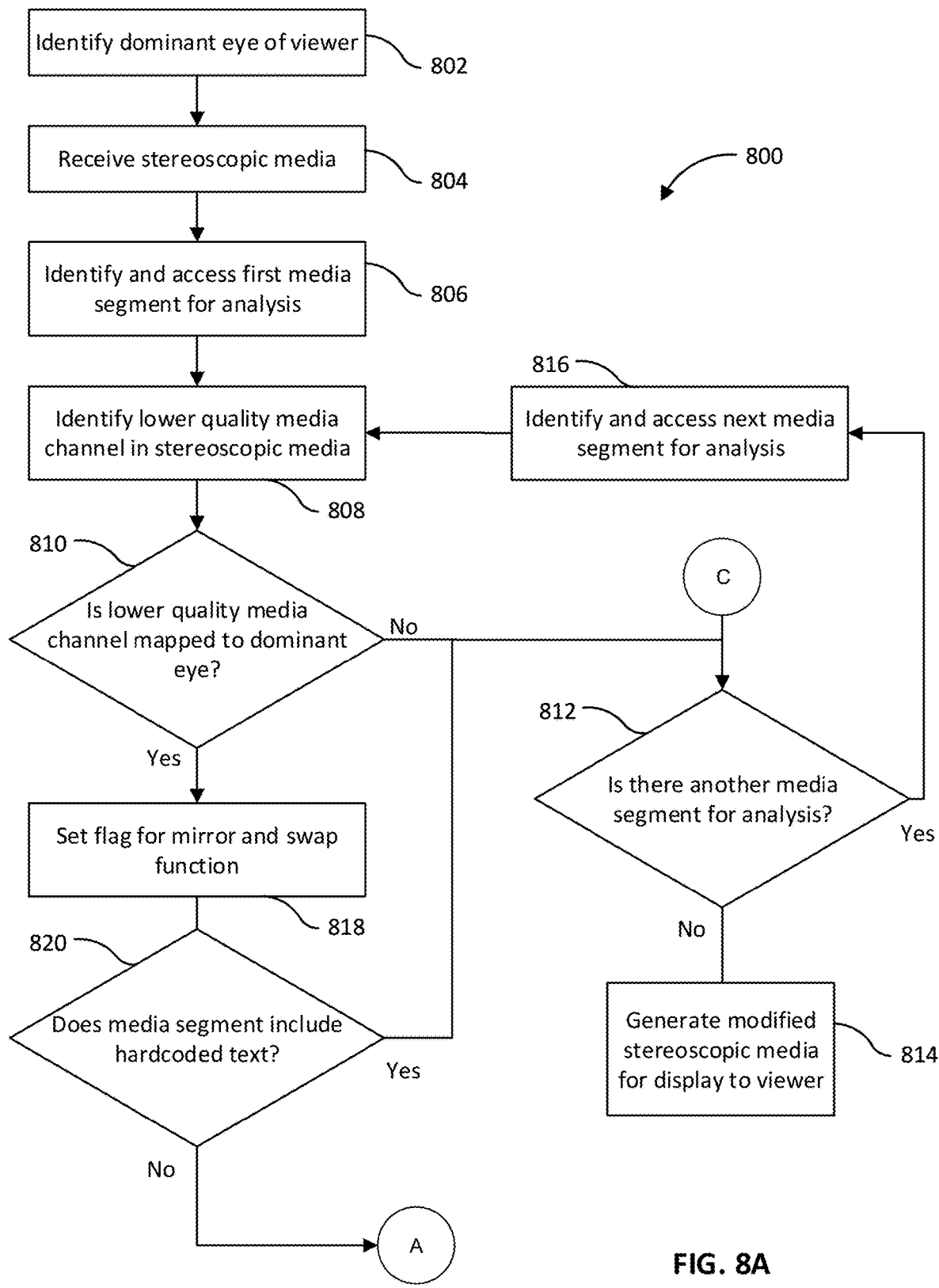
FIGS. 8A-C are a flowchart showing a second exemplary process for enhancing playback of stereoscopic media, in accordance with embodiments of the disclosure.
Figure 8B:
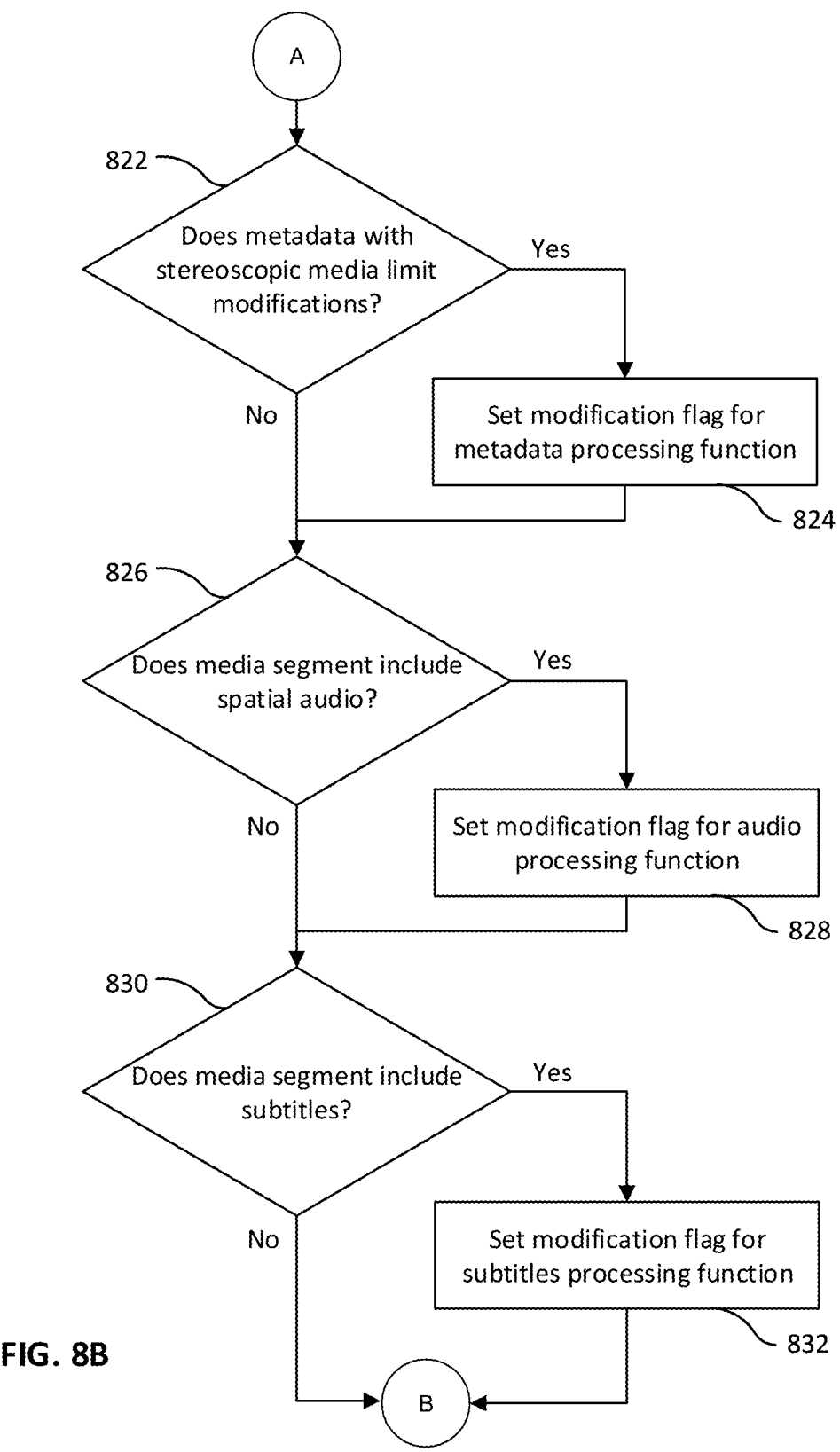
Figure 8C:
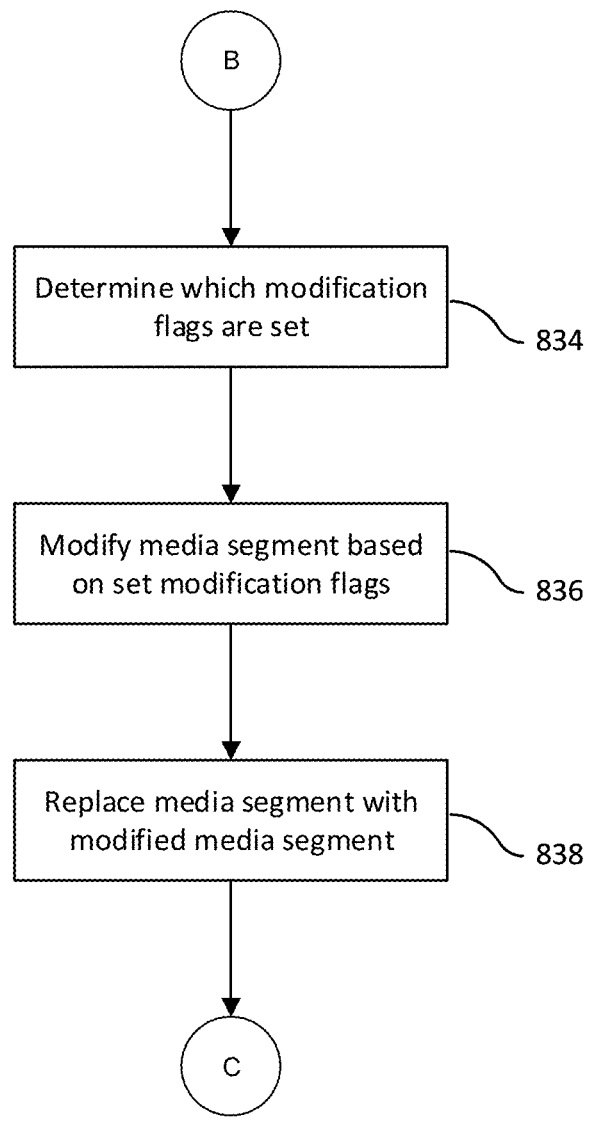

FIGS. 8A-C depict a flowchart illustrating the steps of an exemplary process 800 for enhanced playback of stereoscopic media to a viewer. The process 800 may be implemented on the user equipment discussed herein and other systems for enhancing playback of stereoscopic media. One or more actions of the process 800 may be incorporated into or combined with one or more actions of any other process or embodiment described herein. For purposes of clarity, this process 800 is described in the context of being implemented on the HMD 200 shown in FIG. 2. At step 802, the control circuitry identifies the dominant eye of the user wearing the HMD. In some embodiments, identification of the dominant eye of the user may be identified by reference to profile data associated with the user of the HMD. In some embodiments, the HMD may instruct the user through a short visual test to determine which eye is the user's dominant eye. At step 804, the control circuitry receives the stereoscopic media from a media content source. In some embodiments, the media content source may be another user device on a local network. In some embodiments, the media content source may be a server or other remote system that communicates the stereoscopic media over a wide area network.

Once the HMD has received the stereoscopic media, at step 806 the control circuitry identifies and accesses a first media segment within the stereoscopic media for analysis. In general, the media segment accessed for analysis at step 806 is also the first media segment that is displayed at the start of the stereoscopic media. In some embodiments, such as those involving non-sequential stereoscopic media (e.g., 3D environments and the like), the media segment accessed for analysis at step 806 may be any media segment included as part of the stereoscopic media. In some embodiments, the stereoscopic media may have only a single media segment, and for such stereoscopic media, the HMD continues as described herein. At step 808, the control circuitry determines if the lower-quality media channel (i.e., the left-eye media channel or the right-eye media channel) within the media segment accessed for analysis is mapped to the dominant eye of the viewer. As part of the evaluation at step 808, the control circuitry may determine which of the left-eye media in the left-eye media channel and the right-eye media in the right-eye media channel is the lower-quality media. If the left-eye media is determined to be the lower-quality media, then the left-eye media channel is identified as the lower-quality media channel. If the right-eye media is determined to be the lower-quality media, then the right-eye media channel is identified as the lower-quality media channel.

If, at step 810, the lower-quality media channel is not mapped to the dominant eye of the viewer, then at step 812, the control circuitry determines whether there are any additional media segments within the stereoscopic media. If there are no remaining media segments to analyze, then at step 814, the control circuitry may generate, as needed, the modified stereoscopic media. In embodiments with only a single media segment having the higher-quality media channel mapped to the dominant eye of the viewer, the control circuitry need not generate the modified stereoscopic media. Similarly, if all media segments have the higher-quality media channel mapped to the dominant eye of the viewer, the control circuitry need not generate the modified stereoscopic media. In all other instances, the control circuitry may generate the modified stereoscopic media in view of further evaluations of each media segment within the stereoscopic media.

If, at step 812, additional media segments remain to be analyzed, then at step 816, the control circuitry identifies and accesses the next media segment within the stereoscopic media for analysis. In general, the next media segment accessed for analysis at step 816 is the next media segment in the sequence of display within the stereoscopic media. In some embodiments, such as those involving non-sequential stereoscopic media, the next media segment accessed for analysis at step 816 may be any media segment included as part of the stereoscopic media. In such embodiments, the control circuitry may assign identifiers to the media segments to differentiate between those media segments that have been analyzed and those media segments that have yet to be analyzed. Once the next media segment has been accessed, the process 800 returns to step 808 to determine if the lower-quality media channel within the media segment currently accessed for analysis is mapped to the dominant eye of the viewer.

Returning to step 810, if the lower-quality media channel is mapped to the dominant eye of the viewer, then at step 818, the control circuitry sets a modification flag to perform mirror and swap functions on the media segment. At step 820, the control circuitry determines if the media segment includes text that is not part of subtitles. If the media segment includes text that is not part of subtitles, or subtitles that are hardcoded within the media, the control circuitry proceeds to step 812 to determine if there is another media segment for analysis. Further analysis of media segments that include text outside of subtitles may be stopped because mirroring the media causes text within the media to read backwards when viewed, and in most instances, media with backwards text is undesirable. In some media, subtitles may be embedded or burnt in within the media such that mirroring the media would cause the subtitles to read backwards. For the same reasons, it is undesirable to mirror media with this type of embedded subtitles.

If the media segment does not include text or subtitles that would be turned backwards by mirroring, then at step 822 of FIG. 8B, the control circuitry determines if metadata associated with the stereoscopic media places limits on modifications to the media segment. Such metadata limitations may be associated with the stereoscopic media for a variety of reasons. Some media creators may include such metadata limitations with stereoscopic media so that scenes may be viewed as originally intended by the creator. Some media creators may include such metadata limitations to prevent mirroring that the creator views as undesirable for a particular scene. Some media owners and/or media distributors may include such metadata limitations for copyright or other legal reasons. Although the underlying reasons for limitations placed in the metadata may vary, it may be desirable for the process to honor the limitations to support the marketplace of creators, owners, and/or distributors of stereoscopic media. If metadata is associated with the media segment, then at step 824, the control circuitry sets a modification flag to perform a metadata processing function on the media segment. The metadata processing function may analyze the metadata associated with the stereoscopic media to determine whether any limitations are placed on modifications to the media segment and/or the stereoscopic media. In the event the metadata does place any such limitations (e.g., no mirroring of one or more media segments or scenes, no modifications to the audio, and if one media segment is mirrored, other specified media segments must also be mirrored, among other types of modifications), when the process 800 modifies media segments, the metadata modification limitations may be adhered to by the control circuitry.

If, at step 822, the metadata doesn't place limits on modifications to the media segment, or after step 824, at step 826, the control circuitry determines if the media segment includes spatial audio. If the media segment includes spatial audio, at step 828, the control circuitry sets a modification flag to perform an audio processing function on the media segment. The audio processing function may analyze the audio associated with the stereoscopic media and modify the audio to maintain coherence with the visual scenes of the stereoscopic media. For example, for stereo audio, the control circuitry may swap the spatial positions of the left and right channels. As another example, for audio such as 5.1 surround sound, the control circuitry may swap the spatial positions of the front left and right channels with each other and swap the spatial positions of the rear left and right channels with each other, leaving the front center channel and the low frequency channel unmodified.

If, at step 826, the media segment does not include spatial audio, or after step 828, at step 830, the control circuitry determines if the media segment includes subtitles, and particularly subtitles that are added by overlaying, blending, or compositing with the scenes within the media segment. Subtitles that are overlaid, blended, or composited may be removed or not displayed during the process of mirroring media within a segment to avoid rendering the text of the subtitles backwards in the mirrored media. The subtitles may also be copied, added back into the mirrored media, and reenabled for viewing with the modified stereoscopic media. Importantly, the subtitles are added back into the mirrored media without mirroring the subtitles themselves. This enables the viewer to view the stereoscopic media with enhanced quality and activate readable subtitles if desired. Subtitles that are embedded within the scene of media, however, cannot be processed in this manner by typical user equipment in real time. Therefore, media segments that include embedded subtitles are removed from potential processing by the mirror and swap functions at step 820.

If, at step 830, the media segment does not include subtitles, or after step 832, at step 834 of FIG. 8C, the control circuitry determines which modification flags have been set in relation to the media segment. As discussed above, the modification flags may include flags for the mirror and swap functions, the metadata processing function, the audio processing function, and the subtitles processing function. Flags for other modification functions, if previously set earlier in the process 800 in relation to the media segment, may also be reviewed at step 834. Next, at step 836, the control circuitry modifies the media segment based on the set modification flags. The mirror and swap functions are performed on the media segment unless the metadata indicates that the media segment should not be mirrored. In addition, the metadata processing function, the audio processing function, and/or the subtitles processing function may be performed. The sequence in which each of the functions is performed depends on which of the functions are to be performed. For example, at least the first part of the subtitles processing function (removed and/or not displayed, and also copied) may be performed prior to the mirror function. As another example, the metadata processing function may be performed before any other function to determine if those other functions should be limited or not performed at all.

After the media segment has been modified at step 836, at step 838, the control circuitry replaces the accessed and analyzed segment with the modified segment in the stereoscopic media as part of generating the modified stereoscopic media. In some embodiments, the replacement process may be performed using the received version of the stereoscopic media. In some embodiments, the control circuitry may make a copy of the received stereoscopic media and perform the replacement process on the copy. Following step 838, at step 812 of FIG. 8A, the control circuitry determines if there are more media segments for processing. If there are more media segments for processing, at step 816, the next media segment is accessed, and the process 800 proceeds again to step 808. If there are no more media segments for processing, then at step 814, the modified stereoscopic media is generated.

Figure 9:
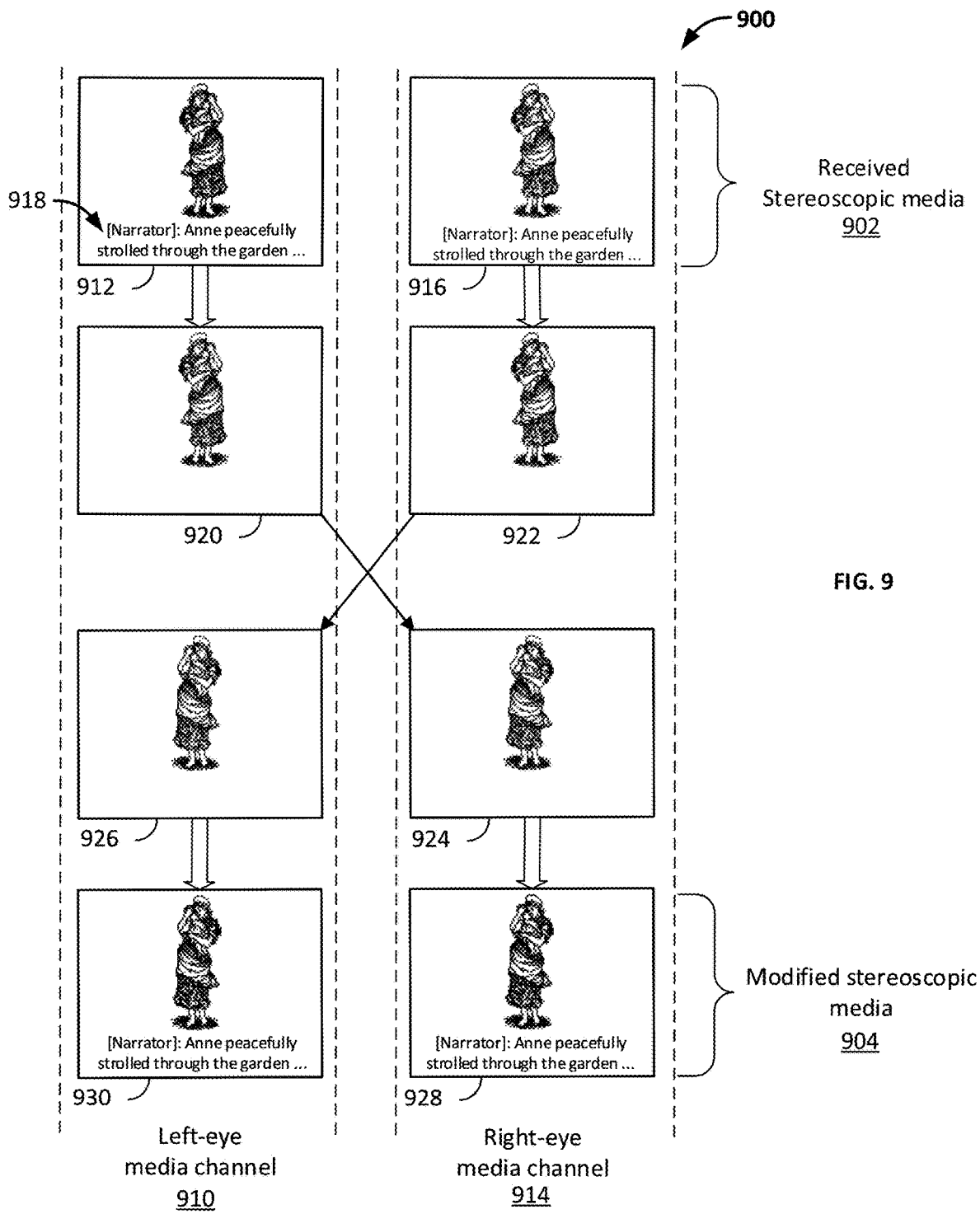
FIG. 9 graphically illustrates mirror and swap functions for a media segment of stereoscopic media including subtitles, in accordance with embodiments of the disclosure.

FIG. 9 schematically illustrates an exemplary process 900 for generating modified stereoscopic media 904 from stereoscopic media 902 while also preserving the readability of subtitles that may be included with the stereoscopic media 902. For purposes of clarity, this process 900 is described in the context of being implemented on the HMD 200 shown in FIG. 2. The process 900 may be implemented using the HMD to process media with subtitles that are included by overlaying, blending, or compositing. However, user equipment such as the HMD does not typically have the processing capabilities to perform the process 900 in real-time for media that includes embedded or burnt-in subtitles. Therefore, while the process 900 is described in terms of processing media with subtitles included by overlaying, blending, or compositing, the process 900 is not intended to be so limited.

The left-eye media channel 910 includes left-eye media 912, and the right-eye media channel 914 includes right-eye media 916. The stereoscopic media 904 includes subtitles 918 as part of the left-eye media 912 and the right-eye media 916. The subtitles 918 may be inserted into the stereoscopic media 918 by overlaying, blending, or compositing. To perform mirror and swap functions on the left-eye media 912 and the right-eye media 916, the control circuitry saves a copy of the subtitles 918 and removes the subtitles 918 from both the left-eye media 912 and the right-eye media 916 so that the subtitles 918 are no longer displayed. Removal of the subtitles 918 generates an intermediate left-eye media 920 and an intermediate right-eye media 922. The intermediate left-eye media 920 and the intermediate right-eye media 922 are processed by the mirror and swap functions, as described herein, to generate, respectively, an intermediate mirrored right-eye media 924 and an intermediate mirrored left-eye media 926. The control circuitry then adds the subtitles into both the intermediate mirrored right-eye media 924 and the intermediate mirrored left-eye media 926 to generate the mirrored right-eye media 928 and the mirrored left-eye media 930. Adding the subtitles may be performed by any one of overlaying, blending, or compositing. In some embodiments, inserting the subtitles by overlaying may be most efficient from processing perspective. In some embodiments, it may be desirable to insert the subtitles by blending or compositing to better preserve the creative presentation of the stereoscopic media 902 with subtitles 918. With generation of the mirrored left-eye media 930 within the left-eye media channel 910 and the mirrored right-eye media 928 within the right-eye media channel 914, the modified stereoscopic media 904 is generated with readable subtitles 918.

In some embodiments, the subtitles 918 in the stereoscopic media 902 may be presented at varying positions with respect to the media or at varying apparent 3D positions with respect to the perceived 3D media. The process 900, when saving a copy of the subtitles, may also save data related to the subtitles that may be used to re-create the position of the subtitles and/or the apparent 3D position after generating the intermediate mirrored right-eye media 924 and the intermediate mirrored left-eye media 926.

Figure 10:
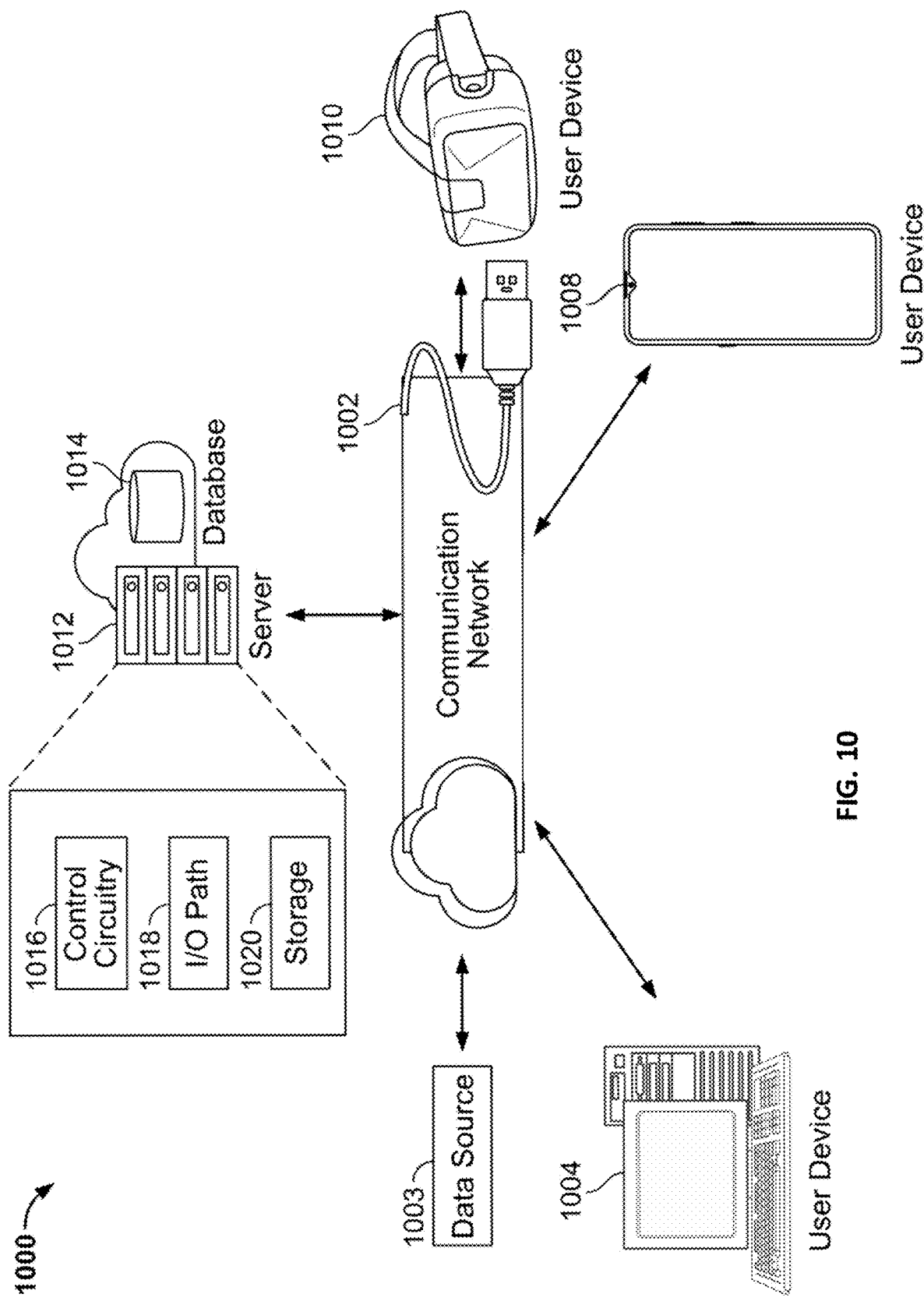
FIG. 10 is an example of an illustrative system implementing equipment, in accordance with embodiments of the disclosure.

FIG. 10 is an example of an illustrative system implementing the user equipment device, in accordance with embodiments of the disclosure. The user equipment devices 1004, 1008, 1010 may be coupled to communication network 1002. The user equipment devices 1004, 1008, 1010 may include control circuitry, storage, and I/O circuitry similar to, e.g., control circuitry 206, storage 210, and I/O circuitry 212 from FIG. 2. For some user equipment devices 1004, 1008, stereoscopic glasses and a polarizing screen may be needed for viewing stereoscopic media. Communication network 1002 may be one or more networks including the internet, a mobile phone network, mobile voice or data network (e.g., a 4G, 5G or LTE network), or other types of communication networks or combinations of communications networks.

System 1000 may comprise data source 1003, one or more servers 1012, and/or one or more edge computing devices. In some embodiments, the application may be executed at one or more of control circuitry 1016 of server 1012 (and/or control circuitry of user equipment 1004, 1008, 1010 and/or control circuitry of one or more edge computing devices). Communications with the data source 1003, which may also be a media content source, and the user equipment devices may be exchanged over one or more communication paths. In some embodiments, the user equipment devices exchange communications with the other user equipment over one or more communication paths. In some embodiments, the data source 1003 and/or server 1012 may be configured to host or otherwise facilitate communication sessions between user equipment 1004, 1008, 1010 and/or any other suitable user equipment, and/or host or otherwise be in communication (e.g., over communication network 1002) with one or more network services.

In some embodiments, server 1012 may include control circuitry 1016 and storage 1020 (e.g., RAM, ROM, Hard Disk, Removable Disk, etc.). Storage 1020 may store one or more databases. Server 1012 may also include an I/O path 1018. In some embodiments, I/O path 1018 is an I/O circuitry. I/O circuitry may be, e.g., a NIC card, audio output device, mouse, keyboard card, any other suitable I/O circuitry device or combination thereof. I/O path 1018 may provide device information, or other data, over a local area network (LAN) or wide area network (WAN), and/or other content and data to control circuitry 1016, which may include processing circuitry, and storage 1020. Control circuitry 1016 may be used to send and receive commands, requests, and other suitable data using I/O path 1018, which may comprise I/O circuitry. I/O path 1018 may connect control circuitry 1016 to one or more communications paths.

Control circuitry 1016 may be based on any suitable control circuitry such as one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, control circuitry 1016 may be distributed across multiple separate processors or processing units, for example, multiple of the same type of processing units (e.g., two Intel Core i7 processors) or multiple different processors (e.g., an Intel Core i6 processor and an Intel Core i7 processor). In some embodiments, control circuitry 1016 executes instructions for an emulation system application stored in memory (e.g., the storage 1020). Memory may be an electronic storage device provided as storage 1020 that is part of control circuitry 1016. Memory may store instruction to run the application.

Data source 1003 may include one or more types of content distribution equipment including a media distribution facility, satellite distribution facility, programming sources, intermediate distribution facilities and/or servers, internet providers, on-demand media servers, and other content providers. In some embodiments, the user equipment devices access the data source 1003 to receive stereoscopic media. In some approaches, data source 1003 may be any suitable server configured to provide any information needed for operation of the user equipment devices as described above and below (e.g., in FIGS. 1-9). For example, data source 1003 may provide stereoscopic media, metadata associated with stereoscopic media, applications for executing functions and operation of user equipment devices, and/or any other suitable data needed for operations of user equipment devices (e.g., as described in FIGS. 1-9).

Although communications paths are not drawn between user equipment, these devices may communicate directly with each other via communications paths as well as other short-range, point-to-point communications paths, such as USB cables, IEEE 1394 cables, wireless paths (e.g., Bluetooth, infrared, IEEE 702-11x, etc.), or other short-range communication via wired or wireless paths. The user equipment may also communicate with each other directly through an indirect path via communication network 1002.

The systems and methods described herein for enhancing playback of stereoscopic media may provide still other advantages. For example, the systems and methods present a low complexity viewer-side optimization that does not require sophisticated competition imaging techniques to create higher quality images for the viewer. Instead, as discussed above, enhanced quality is achieved by directing the higher-quality media channel to the viewer's dominant eye. This improvement has very low computational costs.

An additional advantage may be found when multiple viewers are watching the same stereoscopic media using HMDs. In such circumstances, the systems and methods described herein may provide each viewer with a high-quality viewing experience, regardless of which media channel has the higher-quality media.

The systems and methods described herein may also provide advantages to creators of stereoscopic media. During the creation process, the media may be produced without regard for the creator's dominant eye, as the systems and methods described herein may be used so that the higher-quality media channel is always mapped to the creator's dominant eye during the production process. In addition, the encoding of stereoscopic video can become less complicated or constrained because optimization of media viewing can occur at the time of viewing the stereoscopic media. Asymmetric compression techniques may therefore be used to further reduce the bit rate of the lower quality video channel, such as by reducing or eliminating quality parity between media channels, as the viewing experience is significantly determined by the quality of the higher-quality media channel.

In an embodiment which presents advantages on the creative side, when a creator reviews stereoscopic media, the systems and methods described herein may be leveraged to create a comparison between viewing the stereoscopic media with media channel swapping and viewing the stereoscopic media without media channel swapping. This comparison may additionally be performed with corresponding adjustments to spatial audio, so that the creator may ensure that the viewer is getting the highest quality viewing experience that can be provided for the created stereoscopic media. Additionally, the creator may create metadata to enable creative control of scenes within the stereoscopic media at the time of viewing. This level of creative control can help present the stereoscopic media to the viewer with a high-quality viewing experience and in a manner that most closely reflects the creator's vision for the creative work.

The processes discussed above are intended to be illustrative and not limiting. One skilled in the art would appreciate that the steps of the processes discussed herein may be omitted, modified, combined and/or rearranged, and any additional steps may be performed without departing from the scope of the invention. More generally, the above disclosure is meant to be illustrative and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods. Throughout the specification the phrases "in response to" and "based on" shall be understood to have a broad meaning unless context requires otherwise. For example, "in response to" can refer to a step that is in direct or indirect response to a prior step, and "based on" can refer to a step that is based at least in part on a prior step.

What is claimed is:

1. A method of displaying stereoscopic media comprising:
   identifying, using control circuitry, one of a left eye of a viewer and a right eye of the viewer as a dominant eye of the viewer;
   receiving, via input/output circuitry, the stereoscopic media comprising:
      a first left-eye media channel segment mapped for display to the left eye of the viewer and comprising a first left-eye media; and
      a first right-eye media channel segment mapped for display to the right eye of the viewer and comprising a first right-eye media for synchronized display with the first left-eye media;
   identifying, using the control circuitry, one of the first left-eye media channel segment and the first right-eye media channel segment as a lower-quality media channel segment based on determining which of the first left-eye media and the first right-eye media is a lower-quality media;
   generating, using the control circuitry and in response to the lower-quality media channel segment being mapped for display to the dominant eye of the viewer, a modified stereoscopic media from the stereoscopic media by replacing the first left-eye media in the first left-eye media channel segment with a first mirrored left-eye media and replacing the first right-eye media in the first right-eye media channel segment with a second mirrored right-eye media, wherein:
      the first mirrored left-eye media is generated by mirroring the first right-eye media; and
      the first mirrored right-eye media is generated by mirroring the first left-eye media; and
   displaying, on a display, the modified stereoscopic media to the viewer.

2. The method of claim 1, further comprising generating, using the control circuitry and in response to the lower-quality media channel segment being mapped for display to the dominant eye of the viewer, the modified stereoscopic media from the stereoscopic media by replacing a second left-eye media in a second left-eye media channel segment with a second mirrored left-eye media and replacing a second right-eye media in a second right-eye media channel segment with a second mirrored right-eye media, wherein the stereoscopic media further comprises:
   the second left-eye media channel segment mapped for display to the left eye of the viewer, the second left-eye media channel segment comprising the second left-eye media;
   the second right-eye media channel segment mapped for display to the right eye of the viewer, the second right-eye media channel segment comprising the second right-eye media for synchronized display with the second left-eye media;
   the second mirrored left-eye media is generated by mirroring the second right-eye media; and
   the second mirrored right-eye media is generated by mirroring the second left-eye media.

3. The method of claim 1, wherein:
   the stereoscopic media further comprises:
      a second left-eye media channel segment mapped for display to the left eye of the viewer, the second left-eye media channel segment comprising a second left-eye media; and
      a second right-eye media channel segment mapped for display to the right eye of the viewer, the second right-eye media channel segment comprising a second right-eye media for synchronized display with the second left-eye media; and
   the modified stereoscopic media further comprises:
      the second left-eye media channel segment with the second left-eye media; and
      the second right-eye media channel segment with the second right-eye media.

4. The method of claim 1, further comprising:
   analyzing, using the control circuitry, the stereoscopic media for first spatial audio for playback while the first left-eye media channel segment and the first right-eye media channel segment are displayed to the viewer;
   generating, using the control circuitry and in response to the lower-quality media channel segment being mapped for display to the dominant eye of the viewer, the modified stereoscopic media from the stereoscopic media by replacing the first spatial audio with second spatial audio, the second spatial audio generated by swapping spatial positions of a left audio channel and a right audio channel of the first spatial audio.

5. The method of claim 1, further comprising:
   analyzing, using the control circuitry, the first left-eye media and the first right-eye media for subtitles;

removing, using the control circuitry, the subtitles from the first left-eye media and the first right-eye media prior to mirroring; and regenerating, using the control circuitry, the subtitles for the first mirrored left-eye media and the first mirrored right-eye media.

6. The method of claim 5, further comprising:

determining, using the control circuitry, a screen position of the subtitles in the first left-eye media and the first right-eye media; and regenerating, using the control circuitry, the subtitles for the first mirrored left-eye media and the first mirrored right-eye media at the screen position.

7. The method of claim 5, further comprising:

determining, using the control circuitry, a 3D position of the subtitles in the first left-eye media and the first right-eye media; and regenerating, using the control circuitry, the subtitles for the first mirrored left-eye media and the first mirrored right-eye media at the 3D position.

8. The method of claim 1, further comprising:

identifying, using the control circuitry, modification limitations from metadata received with the stereoscopic media; and generating, using the control circuitry, the modified stereoscopic media from the stereoscopic media in conformance with the identified modification limitations.

9. A system for displaying stereoscopic media comprising:

a display;

input/output circuitry; and control circuitry configured to:

identify one of a left eye of a viewer and a right eye of the viewer as a dominant eye of the viewer;

receive, via the input/output circuitry, the stereoscopic media comprising:

a first left-eye media channel mapped for display to the left eye of the viewer and comprising a first left-eye media; and a first right-eye media channel mapped for display to the right eye of the viewer and comprising a first right-eye media for synchronized display with the first left-eye media;

identify one of the first left-eye media channel and the first right-eye media channel as a lower-quality media channel based on determining which of the first left-eye media and the first right-eye media is a lower-quality media;

generate, using the control circuitry and in response to the lower-quality media channel segment being mapped for display to the dominant eye of the viewer, a modified stereoscopic media from the stereoscopic media by replacing the first left-eye media in the first left-eye media channel segment with a first mirrored left-eye media and replacing the first right-eye media in the first right-eye media channel segment with a second mirrored right-eye media, wherein:

the first mirrored left-eye media is generated by mirroring the first right-eye media; and the first mirrored right-eye media is generated by mirroring the first left-eye media; and display, on the display, the modified stereoscopic media to the viewer.

10. The system of claim 9, wherein the control circuitry is further configured to generate, in response to the lower-quality media channel segment being mapped for display to the dominant eye of the viewer, the modified stereoscopic media from the stereoscopic media by replacing a second left-eye media in a second left-eye media channel segment with a second mirrored left-eye media and replacing a second right-eye media in a second right-eye media channel segment with a second mirrored right-eye media, wherein the stereoscopic media further comprises:

the second left-eye media channel segment mapped for display to the left eye of the viewer, the second left-eye media channel segment comprising the second left-eye media;

the second right-eye media channel segment mapped for display to the right eye of the viewer, the second right-eye media channel segment comprising the second right-eye media for synchronized display with the second left-eye media;

the second mirrored left-eye media is generated by mirroring the second right-eye media; and the second mirrored right-eye media is generated by mirroring the second left-eye media.

11. The system of claim 9, wherein:

the stereoscopic media further comprises:

a second left-eye media channel segment mapped for display to the left eye of the viewer, the second left-eye media channel segment comprising a second left-eye media; and a second right-eye media channel segment mapped for display to the right eye of the viewer, the second right-eye media channel segment comprising a second right-eye media for synchronized display with the second left-eye media; and the modified stereoscopic media further comprises:

the second left-eye media channel segment with the second left-eye media; and the second right-eye media channel segment with the second right-eye media.

12. The system of claim 9, wherein the control circuitry is further configured to:

analyze the stereoscopic media for first spatial audio for playback while the first left-eye media channel segment and the first right-eye media channel segment are displayed to the viewer;

generate, in response to the lower-quality media channel segment being mapped for display to the dominant eye of the viewer, the modified stereoscopic media from the stereoscopic media by replacing the first spatial audio with second spatial audio, the second spatial audio generated by swapping spatial positions of a left audio channel and a right audio channel of the first spatial audio.

13. The system of claim 9, wherein the control circuitry is further configured to:

analyze the first left-eye media and the first right-eye media for subtitles;

remove the subtitles from the first left-eye media and the first right-eye media prior to mirroring; and regenerate the subtitles for the first mirrored left-eye media and the first mirrored right-eye media.

14. The system of claim 13, wherein the control circuitry is further configured to:

determine a screen position of the subtitles in the first left-eye media and the first right-eye media; and regenerate the subtitles for the first mirrored left-eye media and the first mirrored right-eye media at the screen position.

15. The system of claim 13, wherein the control circuitry is further configured to:

determine a 3D position of the subtitles in the first left-eye media and the first right-eye media; and regenerate the subtitles for the first mirrored left-eye media and the first mirrored right-eye media at the 3D position.

16. The system of claim 9, wherein the control circuitry is further configured to:
identify modification limitations from metadata received with the stereoscopic media; and
generate the modified stereoscopic media from the stereoscopic media in conformance with the identified modification limitations.

17. A non-transitory, computer-readable medium having instructions encoded thereon that when executed by control circuitry cause the control circuitry to:
identify one of a left eye of a viewer and a right eye of the viewer as a dominant eye of the viewer;
receive, via an input/output circuitry, the stereoscopic media comprising:
a first left-eye media channel mapped for display to the left eye of the viewer and comprising a first left-eye media; and
a first right-eye media channel mapped for display to the right eye of the viewer and comprising a first right-eye media for synchronized display with the first left-eye media;
identify one of the first left-eye media channel and the first right-eye media channel as a lower-quality media channel based on determining which of the first left-eye media and the first right-eye media is a lower-quality media;
generate, using the control circuitry and in response to the lower-quality media channel segment being mapped for display to the dominant eye of the viewer, a modified stereoscopic media from the stereoscopic media by replacing the first left-eye media in the first left-eye media channel segment with a first mirrored left-eye media and replacing the first right-eye media in the first right-eye media channel segment with a second mirrored right-eye media, wherein:
the first mirrored left-eye media is generated by mirroring the first right-eye media; and
the first mirrored right-eye media is generated by mirroring the first left-eye media; and
display, on a display, the modified stereoscopic media to the viewer.

18. The non-transitory, computer-readable medium of claim 17, wherein the control circuitry is further configured to generate, in response to the lower-quality media channel segment being mapped for display to the dominant eye of the viewer, the modified stereoscopic media from the stereoscopic media by replacing a second left-eye media in a second left-eye media channel segment with a second mirrored left-eye media and replacing a second right-eye media in a second right-eye media channel segment with a second mirrored right-eye media, wherein the stereoscopic media further comprises:
the second left-eye media channel segment mapped for display to the left eye of the viewer, the second left-eye media channel segment comprising the second left-eye media;
the second right-eye media channel segment mapped for display to the right eye of the viewer, the second right-eye media channel segment comprising the second right-eye media for synchronized display with the second left-eye media;
the second mirrored left-eye media is generated by mirroring the second right-eye media; and
the second mirrored right-eye media is generated by mirroring the second left-eye media.

19. The non-transitory, computer-readable medium of claim 17, wherein:
the stereoscopic media further comprises:
a second left-eye media channel segment mapped for display to the left eye of the viewer, the second left-eye media channel segment comprising a second left-eye media; and
a second right-eye media channel segment mapped for display to the right eye of the viewer, the second right-eye media channel segment comprising a second right-eye media for synchronized display with the second left-eye media; and
the modified stereoscopic media further comprises:
the second left-eye media channel segment with the second left-eye media; and
the second right-eye media channel segment with the second right-eye media.

20. The non-transitory, computer-readable medium of claim 17, wherein the control circuitry is further configured to:
analyze the stereoscopic media for first spatial audio for playback while the first left-eye media channel segment and the first right-eye media channel segment are displayed to the viewer;
generate, in response to the lower-quality media channel segment being mapped for display to the dominant eye of the viewer, the modified stereoscopic media from the stereoscopic media by replacing the first spatial audio with second spatial audio, the second spatial audio generated by swapping spatial positions of a left audio channel and a right audio channel of the first spatial audio.

* * * * *